United States Patent
Kuiper et al.

(10) Patent No.: US 12,518,275 B2
(45) Date of Patent: *Jan. 6, 2026

(54) IMPLEMENTING AND DISPLAYING DIGITAL TRANSFER INSTRUMENTS

(71) Applicant: Truist Bank, Charlotte, NC (US)

(72) Inventors: Christopher Jon Kuiper, Douglasville, GA (US); James Raleigh Weaver, Atlanta, GA (US); Ejaz Ahmed Syed, Morrisville, NC (US)

(73) Assignee: TRUIST BANK, Charlotte, NC (US)

( * ) Notice: Subject to any disclaimer, the term of this patent is extended or adjusted under 35 U.S.C. 154(b) by 294 days.

This patent is subject to a terminal disclaimer.

(21) Appl. No.: 18/065,116

(22) Filed: Dec. 13, 2022

(65) Prior Publication Data

US 2024/0193598 A1    Jun. 13, 2024

(51) Int. Cl.
G06Q 20/40    (2012.01)
G06Q 20/04    (2012.01)
G06Q 20/10    (2012.01)
G06Q 20/30    (2012.01)
H04L 9/32    (2006.01)

(52) U.S. Cl.
CPC ....... *G06Q 20/401* (2013.01); *G06Q 20/0425* (2013.01); *G06Q 20/108* (2013.01); *G06Q 20/30* (2013.01); *G06Q 40/028* (2025.08); *H04L 9/3247* (2013.01); *H04L 2209/56* (2013.01)

(58) Field of Classification Search
None
See application file for complete search history.

(56) References Cited

U.S. PATENT DOCUMENTS

| | | | |
|---|---|---|---|
| 8,708,227 B1 | 4/2014 | Oakes, III et al. | |
| 9,807,263 B2* | 10/2017 | Bala | H04N 1/19594 |
| 10,013,681 B1* | 7/2018 | Oakes, III | G06Q 40/00 |
| 10,552,810 B1* | 2/2020 | Ethington | G06Q 20/042 |
| 11,030,752 B1* | 6/2021 | Backlund | G06T 7/0002 |
| 11,037,109 B1* | 6/2021 | Sherman | G06Q 20/3223 |
| 11,295,377 B1 | 4/2022 | Ethington et al. | |
| 2010/0260408 A1 | 10/2010 | Prakash et al. | |
| 2022/0335392 A1* | 10/2022 | Srinivasarangan | G07F 19/20 |
| 2022/0335395 A1* | 10/2022 | Srinivasarangan | G06Q 20/0425 |

OTHER PUBLICATIONS

Truist Bank; Inventor Raphael Fitzgerald; U.S. Appl. No. 17/815,706, filed Jul. 28, 2022. Title: Method for Identifying Handwritten Characters on an Image Using a Classification Model.

* cited by examiner

*Primary Examiner* — David P Sharvin
(74) *Attorney, Agent, or Firm* — Michael A. Springs, Esq.; Shumaker, Loop & Kendrick, LLP; Patrick B. Horne

(57) ABSTRACT

Disclosed are systems and methods for generating and augmenting digital instruments that implement electronic transfers. The system converts instruments to a digital format and applies electronic augmentations in the form of metadata or layered optically perceptible data that can be verified or edited. The electronic augmentations are integrated with the digital instrument prior to transmitting the instrument to a third party to initiate transfer execution.

19 Claims, 6 Drawing Sheets

IMPLEMENTING AND DISPLAYING DIGITAL TRANSFER INSTRUMENTS

TECHNICAL FIELD AND BACKGROUND

The present invention relates generally to the field of generating augmented instruments for electronic transfers.

Conventional techniques for electronic transfers require recipient end users to provide transfer instructions by physically marking a transfer instrument before transmitting the instrument to a third party for processing. Markings the instruments become extremely cumbersome and time consuming for substantial volumes of transfers. To address the drawbacks of conventional techniques, the present systems and methods apply electronic augmentations to transfer instruments according to predefined end user settings. The electronic augmentations operate to provide transfer authorization and instructions. The transfer instruments along with the electronic augmentations are digitized for instant transmission to a remote third party provider. The result is an efficient, automated process for initiating substantial volumes of electronic transfers.

In cases where electronic augmentations are applied according to predefined settings, the electronic augmentations can be appended to, or incorporated within, the digitized transfer instrument as metadata or digital image data. End users may not have an opportunity to verify the electronic augmentations prior to transmission to the third party provider. When specific authorization formats or transfer instructions are required, the result is that the end user may not receive notification that the electronic augmentations were incorrect or noncompliant until after the electronic transfer has been denied. The timing of the notification results in significant end user friction and inefficiencies in the electronic resource transfer process. To overcome these difficulties, the present systems and methods provide end users with an interface that allows the end users to verify the electronic augmentations prior to initiating the transfer.

SUMMARY

According to one embodiment, a system for implementing and augmenting a digital transfer instrument includes a user computing device having one or more integrated software applications that perform operations to implement the present systems and methods. The user computing device, such as a personal computer or mobile device, receives electronic augmentation data from a network computing device. The electronic augmentation data includes information typically found in an endorsement for a check or other negotiable instrument (referred to herein as a "transfer instrument") that used to implement a payment, or transfer of resources. The network computing device could be maintained by a provider that provides the user with account services, or the network computing device could be maintained by a third party, such as a cloud service or Software as a Service provider.

The user computing device generates a graphical user interface ("GUI") that includes a capture input function. Selecting the capture input function activates an image source—i.e., a camera—that is integrated, or in signal communication, with the user computing device. The user utilizes the image source to capture a picture of the transfer instrument. That is, the image source generates image source image data that, when displayed, shows the transfer instrument. The system generates a virtual endorsement, called an "electronic augmentation" or "virtual marking" that can be formatted as augmentation image data for display by the user computing device. The system also analyzes the image data from the image source using a placement analysis to generate augmentation placement data, which corresponds to a location on the transfer instrument to render the electronic augmentation. A monitor, touch screen, or other display device integrated with the user computing device renders the transfer instrument image and the electronic augmentation. The electronic augmentation is rendered as overlaid on the transfer instrument at a location selected according to the augmentation placement data.

The source image data can represent a video, or a series of continuous, dynamic image data received from the image source device. This allows a user to view the transfer instrument through the user computing device display and to align the transfer instrument with the image source device lens to ensure a complete, clear picture. The system can continuously adjust the position of the electronic augmentation on the image of the transfer instrument, if desired, to maintain the relative, consistent position of the electronic augmentation on the transfer instrument. Alternatively, the electronic augmentation can appear static while the user takes steps to align the transfer instrument and the electronic augmentation. The system can render a visual guide on the user computing device display that can be used to align the transfer instrument with the image source device lens. An example visual guide could include four corners or an outline illustrating where the transfer instrument should appear in an image.

The electronic augmentation can be rendered in a manner that does not interfere with or obscure important content or text on the transfer instrument. The augmentation interference reduction can be accomplished using one or a combination of techniques that include selective placement of the electronic augmentation, adjusting the resolution of the electronic augmentation, adjusting the colorization of the electronic augmentation, or adjusting the opacity of the electronic augmentation. For example, the electronic augmentation can be rendered as partially transparent or partially opaque so users can still view the underlying transfer image. In other embodiments, the electronic augmentation can be rendered with a lower (or higher) resolution that the transfer instrument image to distinguish the electronic augmentation. In yet another embodiment, the system can detect the colorization of the transfer instrument and adjust the color of the electronic augmentation accordingly, such as rendering the electronic augmentation in a dark color if the transfer instrument is a light color, or vice versa.

Users have an opportunity not only to ensure the electronic augmentation is properly placed but to edit the electronic augmentation as well. Thus, some embodiments present users with a graphical user interface where users can enter augmentation input selection data, such as specifying transfer instructions prior to creating and rendering the electronic augmentation or specifying an account number that will receive the transfer. The users can further be presented with options to edit the electronic augmentation after the electronic augmentation is generated and rendered on a display. For example, users can tap on the electronic augmentation to relocate the electronic augmentation relative to the transfer instrument or edit the text of the electronic augmentation, such as specifying a different transfer recipient or account.

The electronic augmentation can include information specified by a user and entered as augmentation settings data, including specifying a name of the individual or entity that will receive a transfer or specifying transfer instructions.

System users can also specify permissions as "role data" that places rules and limitations surrounding how certain end users can authorize transfer instruments or what transfer instructions the end users can specify. When users log into the system or launch a software application on the user computing device to authorize a transfer instrument, the system captures information about the user, such as a user identification or unique user name. The system performs a role data check that determines the permissions allocated to a given user, such as the permissible transfer instructions a user can specify, the accounts to which a user can direct a transfer, or whether the user can process transfer instruments at all.

The electronic augmentation can be incorporated into a single image file with the image of the transfer instrument and/or the electronic augmentation data can be appended as metadata to one or more files representing the digitized transfer instrument. The digital transfer instrument can be processed with a variety of content recognition techniques to determine various features of the transfer instrument and to determine the transfer data that is included on the transfer instrument.

BRIEF DESCRIPTION OF THE DRAWINGS

Features, aspects, and advantages of the present invention are better understood when the following detailed description of the invention is read with reference to the accompanying figures, in which.

DETAILED DESCRIPTION

Figure 1:
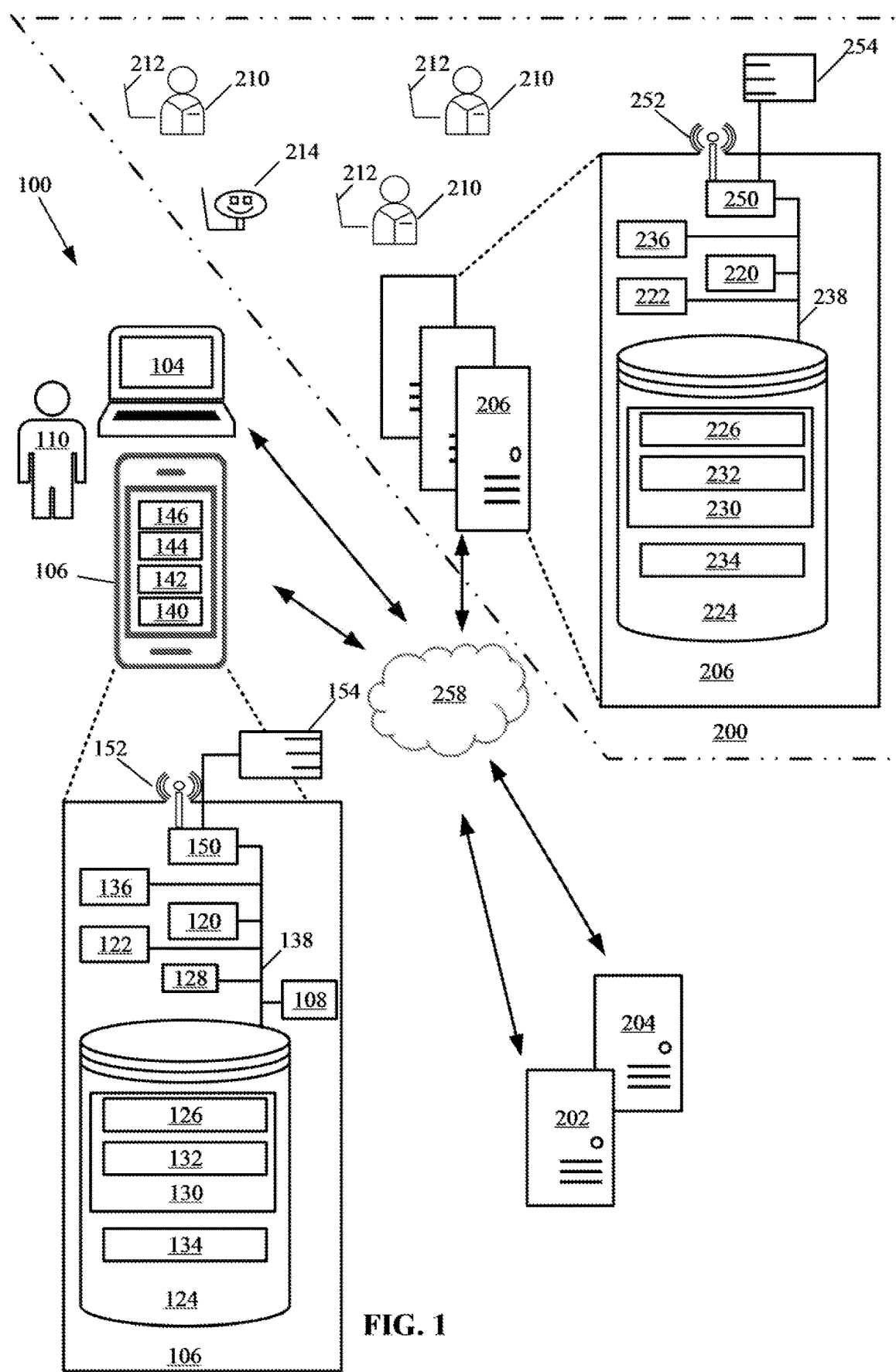
FIG. 1 is an example system diagram according to one embodiment.

The present invention will now be described more fully hereinafter with reference to the accompanying drawings in which example embodiments of the invention are shown. However, the invention may be embodied in many different forms and should not be construed as limited to the representative embodiments set forth herein. The exemplary embodiments are provided so that this disclosure will be both thorough and complete and will fully convey the scope of the invention and enable one of ordinary skill in the art to make, use, and practice the invention. Unless described or implied as exclusive alternatives, features throughout the drawings and descriptions should be taken as cumulative, such that features expressly associated with some particular embodiments can be combined with other embodiments. Unless defined otherwise, technical and scientific terms used herein have the same meaning as commonly understood to one of ordinary skill in the art to which the presently disclosed subject matter pertains.

It will be understood that relative terms are intended to encompass different orientations or sequences in addition to the orientations and sequences depicted in the drawings and described herein. Relative terminology, such as "substantially" or "about," describe the specified devices, materials, transmissions, steps, parameters, or ranges as well as those that do not materially affect the basic and novel characteristics of the claimed inventions as whole (as would be appreciated by one of ordinary skill in the art).

The terms "coupled," "fixed," "attached to," "communicatively coupled to," "operatively coupled to," and the like refer to both: (i) direct connecting, coupling, fixing, attaching, communicatively coupling; and (ii) indirect connecting coupling, fixing, attaching, communicatively coupling via one or more intermediate components or features, unless otherwise specified herein. "Communicatively coupled to" and "operatively coupled to" can refer to physically and/or electrically related components.

As used herein, the terms "enterprise" or "provider" generally describes a person or business enterprise that hosts, maintains, or uses the disclosed systems and methods. The term provider generally describes the person or business enterprise providing goods or services. The term "user" is used interchangeably with the terms end user, customer, or consumer, and these terms represent individuals to whom a provider is rendering goods or services or individuals and/or with whom the provider has an ongoing relationship.

The term electronic augmentation is used synonymously with the terms "virtual endorsement," or "virtual marking," and the term includes an electronic signature or other information used to securely authorize an electronic transfer as well as instructions used to process the electronic transfer. The term transfer instrument denotes a tangible or intangible record that includes information required to authorize and institute an electronic transfer, as discussed more fully below.

Embodiments are described with reference to flowchart illustrations or block diagrams of methods or apparatuses where each block or combinations of blocks can be implemented by computer-readable instructions (i.e., software). The term apparatus includes systems and computer program products. The referenced computer-readable software instructions may be provided to a processor of a general purpose computer, special purpose computer, or other programmable data processing apparatus to produce a particular machine. The instructions, which execute via the processor of the computer or other programmable data processing apparatus, create mechanisms for implementing the functions specified in this specification and attached figures.

The computer-readable instructions are loaded onto a computer or other programmable data processing apparatus to cause a series of operational steps to be performed on the computer or other programmable apparatus to produce a computer-implemented process such that the instructions, which execute on the computer or other programmable apparatus, provide steps for implementing the functions specified in the attached flowchart(s) or block diagram(s). Alternatively, computer software implemented steps or acts may be combined with operator or human implemented steps or acts in order to carry out an embodiment of the disclosed systems and methods.

The computer-readable software instructions may also be stored in a computer-readable memory that can direct a computer or other programmable data processing apparatus to function in a particular manner. In this manner, the instructions stored in the computer-readable memory produce an article of manufacture that includes the instructions, which implement the functions described and illustrated herein.

System Level Description

As shown in FIG. 1, a hardware system 100 configuration according to one embodiment generally includes a user 110 that benefits through use of services and products offered by a provider through an enterprise system 200. The user 110 accesses services and products by use of one or more user computing devices 104 & 106. The user computing device can be a larger device, such as a laptop or desktop computer 104, or a mobile computing device 106, such as smart phone or tablet device with processing and communication capabilities. The user computing device 104 & 106 includes integrated software applications that manage device resources, generate user interfaces, accept user inputs, and facilitate communications with other devices, among other functions. The integrated software applications can include an operating system, such as Linux®, UNIX®, Windows®, macOS®, iOS®, Android®, or other operating system compatible with personal computing devices.

The user 110 can be an individual, a group, or an entity having access to the user computing device 104 & 106. Although the user 110 is singly represented in some figures, at least in some embodiments, the user 110 is one of many, such as a market or community of users, consumers, customers, business entities, government entities, and groups of any size.

The user computing device includes subsystems and components, such as a processor 120, a memory device 122, a storage device 124, or power system 128. The memory device 122 can be transitory random access memory ("RAM") or read-only memory ("ROM"). The storage device 124 includes at least one of a non-transitory storage medium for long-term, intermediate-term, and short-term storage of computer-readable instructions 126 for execution by the processor 120. For example, the instructions 126 can include instructions for an operating system and various integrated applications or programs 130 & 132. The storage device 124 can store various other data items 134, including, without limitation, cached data, user files, pictures, audio and/or video recordings, files downloaded or received from other devices, and other data items preferred by the user, or related to any or all of the applications or programs.

The memory device 122 and storage device 124 are operatively coupled to the processor 120 and are configures to store a plurality of integrated software applications that comprise computer-executable instructions and code executed by the processing device 120 to implement the functions of the user computing device 104 & 106 described herein. Example applications include a conventional Internet browser software application and a mobile software application created by the provider to facilitate interaction with the provider system 200.

According to various embodiments, the memory device 122 and storage device 124 may be combined into a single storage medium. The memory device 122 and storage device 124 can store any of a number of applications which comprise computer-executable instructions and code executed by the processing device 120 to implement the functions of the mobile device 106 described herein. For example, the memory device 122 may include such applications as a conventional web browser application and/or a mobile P2P payment system client application. These applications also typically provide a graphical user interface (GUI) on the display 140 that allows the user 110 to communicate with the mobile device 106, and, for example a mobile banking system, and/or other devices or systems. In one embodiment, when the user 110 decides to enroll in a mobile banking program, the user 110 downloads or otherwise obtains the mobile banking system client application from a mobile banking system, for example enterprise system 200, or from a distinct application server. In other embodiments, the user 110 interacts with a mobile banking system via a web browser application in addition to, or instead of, the mobile P2P payment system client application.

The integrated software applications also typically provide a graphical user interface ("GUI") on the user computing device display screen 140 that allows the user 110 to utilize and interact with the user computing device. Example GUI display screens are depicted in the attached figures. The GUI display screens may include features for displaying information and accepting inputs from users, such as text boxes, data fields, hyperlinks, pull down menus, check boxes, radio buttons, and the like. One of ordinary skill in the art will appreciate that the exemplary functions and user-interface display screens shown in the attached figures are not intended to be limiting, and an integrated software application may include other display screens and functions.

The processing device 120 performs calculations, processes instructions for execution, and manipulates information. The processing device 120 executes machine-readable instructions stored in the storage device 124 and/or memory device 122 to perform methods and functions as described or implied herein. The processing device 120 can be implemented as a central processing unit ("CPU"), a microprocessor, a graphics processing unit ("GPU"), a microcontroller, an application-specific integrated circuit ("ASIC"), a programmable logic device ("PLD"), a digital signal processor ("DSP"), a field programmable gate array ("FPGA"), a state machine, a controller, gated or transistor logic, discrete physical hardware components, and combinations thereof. In some embodiments, particular portions or steps of methods and functions described herein are performed in whole or in part by way of the processing device 120. In other embodiments, the methods and functions described herein include cloud-based computing such that the processing device 120 facilitates local operations, such communication functions, data transfer, and user inputs and outputs.

or operatively coupled with, one or more user input devices and/or one or more user output devices, which are operatively coupled to the processing device 120. The input and output system 136 may include input/output circuitry that may operatively convert analog signals and other signals into digital data, or may convert digital data to another type of signal. For example, the input/output circuitry may receive and convert physical contact inputs, physical movements, or auditory signals (e.g., which may be used to authenticate a user) to digital data. Once converted, the digital data may be provided to the processing device 120. The input and output system 136 may also include a display 140 (e.g., a liquid crystal display (LCD), light emitting diode (LED) display, or the like), which can be, as a non-limiting example, a presence-sensitive input screen (e.g., touch screen or the like) of the mobile device 106, which serves both as an output device, by providing graphical and text indicia and presentations for viewing by one or more user 110, and as an input device, by providing virtual buttons, selectable options, a virtual keyboard, and other indicia that, when touched, control the mobile device 106 by user action. The user output devices include a speaker 144 or other audio device. The user input devices, which allow the mobile device 106 to receive data and actions such as button manipulations and touches from a user such as the user 110, may include any of a number of devices allowing the mobile device 106 to receive data from a user, such as a keypad, keyboard, touch-screen, touchpad, microphone 142, mouse, joystick, other pointer device, button, soft key, infrared sensor, and/or other input device(s). The input and output system 136 may also include a camera 146, such as a digital camera.

The user computing device 104 & 106 may also include a positioning device 108, such as a global positioning system device ("GPS") that determines a location of the user computing device. In other embodiments, the positioning device 108 includes a proximity sensor or transmitter, such as an RFID tag, that can sense or be sensed by devices proximal to the user computing device 104 & 106.

The input and output system 136 may also be configured to obtain and process various forms of authentication via an authentication system to obtain authentication information of a user 110. Various authentication systems may include, according to various embodiments, a recognition system that detects biometric features or attributes of a user such as, for example fingerprint recognition systems and the like (hand print recognition systems, palm print recognition systems, etc.), iris recognition and the like used to authenticate a user based on features of the user's eyes, facial recognition systems based on facial features of the user, DNA-based authentication, or any other suitable biometric attribute or information associated with a user. Additionally or alternatively, voice biometric systems may be used to authenticate a user using speech recognition associated with a word, phrase, tone, or other voice-related features of the user. Alternate authentication systems may include one or more systems to identify a user based on a visual or temporal pattern of inputs provided by the user. For instance, the user device may display, for example, selectable options, shapes, inputs, buttons, numeric representations, etc. that must be selected in a pre-determined specified order or according to a specific pattern. Other authentication processes are also contemplated herein including, for example, email authentication, password protected authentication, device verification of saved devices, code-generated authentication, text message authentication, phone call authentication, etc. The user device may enable users to input any number or combination of authentication systems.

A system intraconnect 138, such as a bus system, connects various components of the mobile device 106. The user computing device 104 & 106 further includes a communication interface 150. The communication interface 150 facilitates transactions with other devices and systems to provide two-way communications and data exchanges through a wireless communication device 152 or wired connection 154. Communications may be conducted via various modes or protocols, such as through a cellular network, wireless communication protocols using IEEE 802.11 standards. Communications can also include short-range protocols, such as Bluetooth® or Near-field communication ("NFC") protocols. Communications may also or alternatively be conducted via the connector 154 for wired connections such by universal serial bus ("USB"), Ethernet, and other physically connected modes of data transfer.

To provide access to, or information regarding, some or all the services and products of the enterprise system 200, automated assistance may be provided by the enterprise system 200. For example, automated access to user accounts and replies to inquiries may be provided by enterprise-side automated voice, text, and graphical display communications and interactions. In at least some examples, any number of human agents 210 act on behalf of the provider, such as customer service representatives, advisors, managers, and sales team members.

Human agents 210 utilize agent computing devices 212 to interface with the provider system 200. The agent computing devices 212 can be, as non-limiting examples, computing devices, kiosks, terminals, smart devices such as phones, and devices and tools at customer service counters and windows at POS locations. In at least one example, the diagrammatic representation and above-description of the components of the user computing device 104 & 106 in FIG. 1 applies as well to the agent computing devices 212. As used herein, the general term "end user computing device" can be used to refer to either the agent computing device 212 or the user computing device 110 depending on whether the agent (as an employee or affiliate of the provider) or the user (as a customer or consumer) is utilizing the disclosed systems and methods to segment, parse, filter, analyze, and display content data.

Human agents 210 interact with users 110 or other agents 212 by phone, via an instant messaging software application, or by email. In other examples, a user is first assisted by a virtual agent 214 of the enterprise system 200, which may satisfy user requests or prompts by voice, text, or online functions, and may refer users to one or more human agents 210 once preliminary determinations or conditions are made or met.

A computing system 206 of the enterprise system 200 may include components, such as a processor device 220, an input-output system 236, an intraconnect bus system 238, a communication interface 250, a wireless device 252, a hardwire connection device 254, a transitory memory device 222, and a non-transitory storage device 224 for long-term, intermediate-term, and short-term storage of computer-readable instructions 226 for execution by the processor device 220. The instructions 226 can include instructions for an operating system and various software applications or programs 230 & 232. The storage device 224 can store various other data 234, such as cached data, files for user accounts, user profiles, account balances, and transaction histories, files downloaded or received from other devices, and other data items required or related to the applications or programs 230 & 232.

The network 258 provides wireless or wired communications among the components of the system 100 and the environment thereof, including other devices local or remote to those illustrated, such as additional mobile devices, servers, and other devices communicatively coupled to network 258, including those not illustrated in FIG. 1. The network 258 is singly depicted for illustrative convenience, but may include more than one network without departing from the scope of these descriptions. In some embodiments, the network 258 may be or provide one or more cloud-based services or operations.

The network 258 may be or include an enterprise or secured network, or may be implemented, at least in part, through one or more connections to the Internet. A portion of the network 258 may be a virtual private network ("VPN") or an Intranet. The network 258 can include wired and wireless links, including, as non-limiting examples, 802.11a/b/g/n/ac, 802.20, WiMax, LTE, and/or any other wireless link. The network 258 may include any internal or external network, networks, sub-network, and combinations of such operable to implement communications between various computing components within and beyond the illustrated environment 100.

External systems 270 and 272 represent any number and variety of data sources, users, consumers, customers, enterprises, and groups of any size. In at least one example, the external systems 270 and 272 represent remote terminal utilized by the enterprise system 200 in serving users 110. In another example, the external systems 270 and 272 represent electronic systems for processing payment transactions. The system may also utilize software applications that function using external resources 270 and 272 available through a third-party provider, such as a Software as a Service ("SasS"), Platform as a Service ("PaaS"), or Infrastructure as a Service ("IaaS") provider running on a third-party cloud service computing device. For instance, a cloud computing device may function as a resource provider by providing remote data storage capabilities or running software applications utilized by remote devices.

SaaS may provide a user with the capability to use applications running on a cloud infrastructure, where the applications are accessible via a thin client interface such as a web browser and the user is not permitted to manage or control the underlying cloud infrastructure (i.e., network, servers, operating systems, storage, or specific application capabilities that are not user-specific). PaaS also do not permit the user to manage or control the underlying cloud infrastructure, but this service may enable a user to deploy user-created or acquired applications onto the cloud infrastructure using programming languages and tools provided by the provider of the application. In contrast, IaaS provides a user the permission to provision processing, storage, networks, and other computing resources as well as run arbitrary software (e.g., operating systems and applications) thereby giving the user control over operating systems, storage, deployed applications, and potentially select networking components (e.g., host firewalls).

The network 258 may also incorporate various cloud-based deployment models including private cloud (i.e., an organization-based cloud managed by either the organization or third parties and hosted on-premises or off premises), public cloud (i.e., cloud-based infrastructure available to the general public that is owned by an organization that sells cloud services), community cloud (i.e., cloud-based infrastructure shared by several organizations and manages by the organizations or third parties and hosted on-premises or off premises), and/or hybrid cloud (i.e., composed of two or more clouds e.g., private community, and/or public).

The embodiment shown in FIG. 1 is not intended to be limiting, and one of ordinary skill in the art will appreciate that the system and methods of the present invention may be implemented using other suitable hardware or software configurations. For example, the system may utilize only a single computing system 206 implemented by one or more physical or virtual computing devices, or a single computing device may implement one or more of the computing system 206, agent computing device 206, or user computing device 104 & 106.

Artificial Intelligence

A machine learning program may be configured to implement stored processing, such as decision tree learning, association rule learning, artificial neural networks, recurrent artificial neural networks, long short term memory networks, inductive logic programming, support vector machines, clustering, Bayesian networks, reinforcement learning, representation learning, similarity and metric learning, sparse dictionary learning, genetic algorithms, k-nearest neighbor ("KNN"), and the like. Additionally or alternatively, the machine learning algorithm may include one or more regression algorithms configured to output a numerical value in response to a given input. Further, the machine learning may include one or more pattern recognition algorithms e.g., a module, subroutine or the like capable of translating text or string characters and/or a speech recognition module or subroutine. The machine learning modules may include a machine learning acceleration logic (e.g., a fixed function matrix multiplication logic) that implements the stored processes or optimizes the machine learning logic training and interface.

One subfield of machine learning includes neural networks. A neural network generally includes connected units, neurons, or nodes (e.g., connected by synapses) and may allow for the machine learning program to improve performance. A neural network may define a network of functions, which have a graphical relationship. Various neural networks that implement machine learning exist including, for example, feedforward artificial neural networks, perceptron and multilayer perceptron neural networks, radial basis function artificial neural networks, recurrent artificial neural networks, modular neural networks, long short term memory networks, as well as various other neural networks.

A feedforward network may include a topography with a hidden layer of nodes between an input layer and an output layer. The input layer includes input nodes that communicate input data, variables, matrices, or the like to the hidden layer that is implemented with one or more layers of hidden layer nodes. A first hidden layer generates a representation and/or transformation of the input data into a form that is suitable for generating output data. For network topologies having multiple hidden layers, the outputs of the first hidden layer feed a second layer of hidden nodes and so on until finally feeding the output layer of nodes. Adjacent layers of the topography are connected at the edges of the nodes of the respective layers, but nodes within a layer typically are not separated by an edge.

In at least one embodiment of a feedforward network, data is communicated to the nodes of the input layer, which then communicates the data to the hidden layer. The hidden layer may be configured to determine the state of the nodes in the respective layers and assign weight coefficients or parameters of the nodes based on the edges separating each of the layers. That is, the hidden layer implements activation functions between the input data communicated from the input layer and the output data communicated to the nodes of the output layer. The hidden layers are intermediate the input and output layers and are generally where all or most of the computation is performed.

Neural networks may perform a supervised learning process where known inputs and known outputs are utilized to categorize, classify, or predict a quality of a future input. However, additional or alternative embodiments of the machine learning program may be trained utilizing unsupervised or semi-supervised training, where none of the outputs or some of the outputs are unknown, respectively. Typically, a machine learning algorithm is trained (e.g., utilizing a training data set) prior to modeling the problem with which the algorithm is associated. Supervised training of the neural network may include choosing a network topology suitable for the problem being modeled by the network and providing a set of training data representative of the problem. Supervised learning software systems implement techniques that include, without limitation, Latent Semantic Analysis ("LSA"), Probabilistic Latent Semantic Analysis ("PLSA"), Latent Dirichlet Allocation ("LDA"), and more recent Bidirectional Encoder Representations from Transformers ("BERT").

Generally, the machine learning algorithm may adjust the weight coefficients until any error in the output data generated by the algorithm is less than a predetermined, acceptable level. For instance, the training process may include comparing the generated output produced by the network in response to the training data with a desired or correct output. An associated error amount may then be determined for the generated output data, such as for each output data point generated in the output layer. The associated error amount may be communicated back through the system as an error signal, where the weight coefficients assigned in the hidden layer are adjusted based on the error signal. For instance, the associated error amount (e.g., a value between −1 and 1) may be used to modify the previous coefficient (e.g., a propagated value). The machine learning algorithm may be considered sufficiently trained when the associated error amount for the output data is less than the predetermined, acceptable level (e.g., each data point within the output layer includes an error amount less than the predetermined, acceptable level). Thus, the parameters determined from the training process can be utilized with new input data to categorize, classify, and/or predict other values based on the new input data.

Unsupervised learning software systems can perform training operations on unlabeled data and less requirement for time and expertise from trained data scientists. Unsupervised learning software systems can be designed with integrated intelligence and automation to automatically discover information, structure, and patterns from content data.

Unsupervised learning software systems can be implemented with clustering software techniques that include, without limitation: (i) K-mean clustering; (ii) Mean-Shift clustering; (iii) density based special clustering of applications with noise (e.g., DBSCAN); (iv) spectral clustering; (v) Principal Component Analysis; (vi) Neural Topic Modeling ("NTM"); (vii) expectation maximization (e.g., EM) clustering using Gaussian mixture models (e.g., GMM); (viii) agglomerative hierarchical clustering; (viii) Hopefield Networks; (ix) a Boltzmann Machines; (x) a Sigmoid Belief Net; (xi) Deep Belief Networks; (xii) a Helmholtz Machine; (xiii) a Kohonen Network where each neuron of an output layer holds a vector with a dimensionality equal to the number of neurons in the input layer, and in turn, the number of neurons in the input layer is equal to the dimensionality of data points given to the network; (xiv) a Self-Organizing Map ("SOM") having a set of neurons connected to form a topological grid (usually rectangular) that, when presented with a pattern, the neuron with closest weight vector is considered to be the output with the neuron's weight adapted to the pattern, as well as the weights of neighboring neurons, to naturally find data clusters; and (xv) a Centroid Neural Network that is premised on Kmeans clustering software processing techniques.

Clustering software techniques can automatically group similar data together to accelerate the derivation and verification a new classification or subject, and not just classification into an existing subject or classification. In one embodiment, clustering may be performed using a cluster model to group data points based on certain similarities using unlabeled data. Example cluster models may include, for example, connectivity models, centroid models, distribution models, density models, group models, graph based models, neural models and the like.

An additional or alternative type of neural network suitable for use in the machine learning program and/or module is a Convolutional Neural Network ("CNN"). A CNN is a type of feedforward neural network that may be utilized to model data associated with input data having a grid-like topology. In some embodiments, at least one layer of a CNN may include a sparsely connected layer, in which each output of a first hidden layer does not interact with each input of the next hidden layer. For example, the output of the convolution in the first hidden layer may be an input of the next hidden layer, rather than a respective state of each node of the first layer. CNNs are typically trained for pattern recognition, such as speech processing, language processing, and visual processing. As such, CNNs may be particularly useful for implementing optical and pattern recognition programs required from the machine learning program.

A CNN may be configured to apply the convolution mathematical operation to the respective nodes of each filter and communicate the same to the corresponding node of the next subsequent layer. As an example, the input to the convolution layer may be a multidimensional array of data. The convolution layer, or hidden layer, may be a multidimensional array of parameters determined while training the model.

An additional or alternative type of feedforward neural network suitable for use in the machine learning program and/or module is a Recurrent Neural Network ("RNN"). An RNN may allow for analysis of sequences of inputs rather than only considering the current input data set. RNNs typically include feedback loops/connections between layers of the topography, thus allowing parameter data to be communicated between different parts of the neural network. RNNs typically have an architecture including cycles, where past values of a parameter influence the current calculation of the parameter. That is, at least a portion of the output data from the RNN may be used as feedback or input in calculating subsequent output data. In some embodiments, the machine learning module may include an RNN configured for language processing (e.g., an RNN configured to perform statistical language modeling to predict the next word in a string based on the previous words). The RNN(s) of the machine learning program may include a feedback system suitable to provide the connection(s) between subsequent and previous network layers.

In an additional or alternative embodiment, the machine learning program may include one or more support vector machines. A support vector machine may be configured to determine a category to which input data belongs. For example, the machine learning program may be configured to define a margin using a combination of two or more of the input variables and/or data points as support vectors to maximize the determined margin. Such a margin may generally correspond to a distance between the closest vectors that are classified differently. The machine learning program may be configured to utilize a plurality of support vector machines to perform a single classification. For example, the machine learning program may determine the category to which input data belongs using a first support vector determined from first and second data points/variables, and the machine learning program may independently categorize the input data using a second support vector determined from third and fourth data points/variables. The support vector machine(s) may be trained similarly to the training of neural networks (e.g., by providing a known input vector, including values for the input variables) and a known output classification. The support vector machine is trained by selecting the support vectors and/or a portion of the input vectors that maximize the determined margin.

Generally, the neural network(s) of the machine learning program may include a relatively large number of layers (e.g., three or more layers) and are referred to as deep neural networks. According to various implementations, deep neural networks incorporate neurons, synapses, weights, biases, and functions and can be trained to model complex non-linear relationships. Various deep learning frameworks may include, for example, TensorFlow, MxNet, PyTorch, Keras, Gluon, and the like. Training a deep neural network may include complex input output transformations and may include, according to various embodiments, a backpropagation algorithm. According to various embodiments, deep neural networks may be configured to classify images of handwritten digits from a dataset or various other images.

It should be appreciated that the machine learning program may include variations, adaptations, and alternatives suitable to perform the operations necessary for the system, and the present disclosure is equally applicable to such suitably configured machine learning and/or artificial intelligence programs, modules, etc. For instance, the machine learning program may include one or more long short-term memory RNNs, convolutional deep belief networks, deep belief networks DBNs, and the like. DBNs, for instance, may be utilized to pre-train the weighted characteristics and/or parameters using an unsupervised learning process. Further, the machine learning module may include one or more other machine learning tools (e.g., Logistic Regression ("LR"), Naive-Bayes, Random Forest ("RF"), matrix factorization, and support vector machines) in addition to, or as an alternative to, one or more neural networks, as described herein.

Those of skill in the art will also appreciate that other types of neural networks may be used to implement the systems and methods disclosed herein, including, without limitation, radial basis networks, deep feed forward networks, gated recurrent unit networks, auto encoder networks, variational auto encoder networks, Markov chain networks, Hopefield Networks, Boltzman machine networks, deep belief networks, deep convolutional networks, deconvolutional networks, deep convolutional inverse graphics networks, generative adversarial networks, liquid state machines, extreme learning machines, echo state networks, deep residual networks, Kohonen networks, and neural turning machine networks, as well as other types of neural networks known to those of skill in the art.

Different neural network architectures can be more particularly suited for particular uses to process different types of data inputs and render specific outputs. For example, different neural network architectures can be better suited to perform natural language processing and topic modeling while other types of neural network architectures are more well suited for predictive modeling of future expected data.

To implement natural language processing technology, for example, suitable neural network architectures can include, without limitation: (i) multilayer perceptron ("MLP") networks having three or more layers and that utilizes a nonlinear activation function (mainly hyperbolic tangent or logistic function) that allows the network to classify data that is not linearly separable; (ii) convolutional neural networks; (iii) recursive neural networks; (iv) recurrent neural networks; (v) LSTM network architecture; (vi) Bidirectional Long Short-Term Memory network architecture, which is an improvement upon LSTM by analyzing word, or communication element, sequences in forward and backward directions; (vii) Sequence-to-Sequence networks; and (viii) shallow neural networks such as word2vec (i.e., a group of shallow two-layer models used for producing word embedding that takes a large corpus of alphanumeric content data as input to produces a vector space where every word or communication element in the content data corpus obtains the corresponding vector in the space).

To perform predictive analysis of expected future values of data, suitable neural network architectures can include various deep-learning techniques and specific architectures that include, but are not limited to: (i) LSTM network architecture; (ii) deep-learning, cyclic recurrent neural networks; (iii) an Elman recurrent neural network; (iv) convolutional neural networks; (v) multilayer perceptron networks; (vi) TensorFlow networks; (vii) MxNet networks; (viii) PyTorch networks; (ix) Keras networks; and (x) Gluon networks.

Interface Between User Computing Devices and a Provider System

Disclosed are systems and methods that allow end users to initiate, authorize, and provide processing instructions for electronic transfers by creating, viewing, and applying electronic augmentations to a digital transfer instrument. The electronic augmentations are utilized by a provider to process electronic transfers. The electronic augmentations provide information concerning the transfer, such as a user identification for the user receiving the transfer, a product identification, and instructions for processing the transfer.

Users initiate electronic transfers and apply electronic augmentations using one or more software applications that are integrated with a computing device that is being utilized by a user, such as a user personal or mobile computing device or a provider terminal accessed by a user. The software can be created and maintained by the provider, such as a provider "mobile app," or created by a third-party source, such as an Internet browser software application that is used to interface with a provider system. The software employed by users to interface with the provider system will generally be referred to as a Provider Interface Application.

The Provider Interface Application can be integrated with, or installed on, a user computing device, a provider terminal computing device, or another type of computing device utilized by the user. The Provider Interface Application can itself be comprised of one or more software services, software modules, or application programming interfaces ("APIs") that interface with the other hardware and software components integrated with a computing device. In some instances, the Provider Interface Application may "call," or interface with, APIs or software services integrated with the computing device operating system software.

In the present system, the Provider Interface Application can include or can interface with a Camera API that converts inputs entered by a user into software messages, commands, and data that is formatted for processing by the camera device in performing image capturing functions. A user may select a capture input function or a "flash" input function on the user computing device that the Camera API converts into a software command that causes the camera to take a picture and emit a flash of light to enhance the resulting image. As further non-limiting examples, the Provider Interface Application can include an Interface Service Module that generates graphical user interfaces ("GUIs") displayed to users or an Image Processing Module that performs functions that analyze, edit, or manipulate image data from the camera.

The user computing devices launch and run integrated software applications, such as a Provider Interface Application, to securely connect to the provider system to establish settings that are used to generate one or more electronic augmentations. The user computing devices also run the integrated software applications to digitize transfer instruments and apply the electronic augmentations before transmitting the transfer instrument and electronic augmentations to a provider for processing. Once a secure connection is established, end users navigate a series of GUIs to interact with the provider system and to digitize a transfer instrument by, for instance, capturing a photograph of the transfer instrument. The electronic augmentation is applied to the digitized transfer instrument and presented to the end user for verification before initiating the transfer. The user computing device interacts with components of a provider system, such as various network computing devices (i.e., a server).

In particular, user computing devices communicate with a provider system by sending data to and from external, public-facing component of the provider computing system, such as an external server that can be a web server or other external communication computing device. The external server in turn interacts with an internal interface computing device also associated with a provider computing system. Among other functions, the internal interface computing device is responsible for processing sensitive data gathered from the "back end" components of a provider computer system that may be protected by a firewall software application or system. The internal interface computing devices thus prevent third-party computing devices and applications and from having direct access to the sensitive data stored to a provider system.

The provider external server processes communication data requests sent to, and received from, the user computing device or from third party applications and computing devices. The external server routes communications requesting sensitive data through the internal server for secure communication. The internal server in turn communicates with other back end components of the provider system, such as databases and servers that store sensitive user data (e.g., account numbers, addresses, resource availability data or account balances, etc.).

In accessing the provider system, the user computing device transmits a user interface transmit command to the external server that can include: (i) an Internet Protocol ("IP") address for the user computing device; (ii) system configuration data; and (iii) navigation data (e.g., data corresponding to browsing history, or websites and Internet Protocol addresses accessed by the user computing device). In response to the user interface transmit command, the external server returns interface display data and a digital cookie that is stored to the user computing device and used to track functions and activities performed by the user computing device.

In some embodiments, the system configuration data and navigation data is utilized by the external server to generate the interface display data. For instance, the system configuration data might indicate that the user computing device is utilizing a particular Internet browser or mobile software application to communicate with the provider system. The external server then generates interface display data that includes instructions compatible with, and readable by, the particular Internet browser or mobile software application. As another example, if the navigation data indicate the user computing device previously visited a provider webpage, the interface display data can include instructions for displaying a customized message on the user computing device, such as "Welcome back Patrick!"

After receiving interface display data, the user computing device processes the display data and renders GUI screens presented to users, such as a provider website or a GUI within a provider mobile software application. In some embodiments, the system configuration data may be sent to the provider system in a separate message subsequent to the user interface transmit command message.

The interface display data can include one or more of the following: (i) webpage data used by the user computing device to render a webpage in an Internet browser software application; (ii) mobile app display data used by the user computing device to render GUI screens within a mobile software application; (iii) user transfer data, or just "transfer data," that is used by the user computing device to render a webpage GUI that provides users access to view user resource availability data (e.g., account types and balances) and to view, select, and establish transfer instruction parameters. Categories of interface display data can include graphical elements, digital images, text, numbers, colors, fonts, or layout data representing the orientation and arrangement graphical elements and alphanumeric data on a user interface screen.

The user computing device may also transmit system configuration data to the provider system that is used to verify a user identify or authenticate the user computing device. System configuration data can include, without limitation: (i) a unique identifier for the user computing device (e.g., a media access control ("MAC") address hard-coded into a communication subsystem of the user computing device); (ii) a MAC address for the local network of a user computing device (e.g., a router MAC address); (iii) copies of key system files that are unlikely to change between instances when a user accesses the provider system; (iv) a list of applications running or installed on the user computing device; and (v) any other data useful for evaluating users and authenticating a user or user computing device.

The user computing device can capture geolocation data that is used to authenticate the device or to create an electronic augmentation. The geolocation data can be captured from a global positioning system integrated with the user computing device. In other embodiments, the provider system can determine location data for the user computing device based on the user device IP address. The provider system includes a software application that transmits the user device IP address to an Identity & Location API that utilizes the device IP address to determine an approximate geographic location of the user computing device. The Identity & Location API passes the user device IP address to a database or a third-party software service that returns geographic location data for the user device IP address, such as a city, county, or state. The Identity & Location API stores the geographic data to a database record on the provider.

The user computing device authenticates to the provider system if the user has an existing electronic account with the provider. The user computing device navigates to a login GUI and enters user authentication data, such as a user name and password. The user then selects a submit function on the login GUI to transmit an user authentication request message that includes the user authentication data to the provider external server. In some embodiments, the user authentication data and user authentication request message can further include elements of the system configuration data that are used to authenticate the user, such as a user computing device identification or a user device IP address.

The external server passes user authentication request message to an identity management service, which performs a verification analysis to verify the identity of the user or user computing device. The verification analysis compares the received user authentication data to stored user authentication data to determine whether the received and stored authentication data sets match. The identity management service, thus, determines whether a correct user name, password, or device identification, or other authentication data is received. The identity management service returns an authentication notification message to the external server. The authentication notification message includes a verification flag indicating whether the verification passed or failed and a reason for a failed authentication, such as an unrecognized user name, password, or user computing device identification.

The user authentication request message can also include system configuration data, and the provider's back end servers can use system configuration data and user account data to perform the authentication process. As one example, the identity management service might store a user computing device MAC address to a database record as part of the user account data. Upon receipt of an user authentication request message that includes a MAC address, the identity management service compares the received MAC address data against stored MAC address data that is associated with the user account data. In this manner, the user computing device can also be authenticated to the provider system. If the received and stored MAC addresses do not match, the identity management service returns an authentication decision message to the external server indicating the authentication failed because the user computing device could not be authenticated. The external server can then prompt the user to verifying whether the consumer is using a new device to login to the provider system, and if so, begin the process of registering a new device to the provider's system.

The system can also utilize multifactor authentication techniques ("MFA") to authenticate the user identity or a user computing device. As one example, if the user authentication data is successfully verified, a MFA software process running on the provider system can initiate a telephone call to a phone number stored as part of the verification analysis. Upon receiving the call, the user selects an input function on the telephone to transmit response data to the MFA software process that confirms receipt of the call, thereby further authenticating the user's identity. The function can be the user's selection of any key on the telephone or a pre-determined sequence of keys, such as a passcode.

Those of skill in the art will appreciate that other forms of MFA are possible, such as sending a text message containing a passcode to the user's cellular phone that must be entered into a user interface screen or utilizing a separate software application running on the user computing device to generate a key or passcode that is verified by the provider system.

Establishing Electronic Augmentations and User Permissions

Prior to initiating an electronic transfer, users establish electronic augmentations that can be applied to digitized transfer instruments. User computing devices establish a secure communication session with the provider computing system that authenticates the user identity and the user computing device, which can be preregistered with, and known to, the provider system. Users navigate a series of GUIs to view and edit user product settings and information, communicate with the provider, and initiate electronic transfers, among other functions. The products can be an account, such as a checking account, savings account, credit card account, loan account, or brokerage account, among other types of provider services and products. Users can be associated with one or more provider products, such as a user that has multiple accounts established with a provider. Conversely, each product can be associated with multiple users, such having multiple users authorized to use a single product or account.

Users can establish one or more distinct electronic augmentations and permissions for each product. The electronic augmentations and permissions define, for example: (i) the identity of users that are authorized to initiate or approve a resource transfer for each product; (ii) transfer instructions for processing a resource transfer; and (iii) the particular transfer instructions that each user is permitted to authorize.

The permissions are stored as role data in a augmentation settings database on the provider system. The system performs a role data check prior to processing a transfer instrument to determine the scope of a user's permissions in processing a transfer instrument. The role data can include, without limitation: (i) an initialization indicator having a first value if the user permitted to initiate and authorize an electronic transfer and a second value if the user is not permitted to initiate an authorize an electronic transfer; and (ii) transfer instruction role data that indicates the type of transfer instructions a user is permitted to initiate or authorize. A unique user identification, the initialization indicator, and the transfer instruction role data are stored as a augmentation settings database record in the augmentation settings database. The augmentation settings database is implemented as a relational database that maintains an association or correlation between the various data types stored to the augmentation settings database record.

The transfer instruction data defines particular actions taken when processing an electronic transfer of resources. Transfer instruction data can include, without limitation, instructions specifying: (i) a product identification for an account that will receive resources being electronically transferred; (ii) restrictions on the transfer destination, such as a "for deposit only" instruction that requires the entire amount or value of the resources being electronically transferred to be deposited into a single account associated with a specified product identification; (iii) that the resources being electronically transferred should be directed to a third party, such as a "pay to the order of" instruction; or (iv) that the transfer is directed to a particular beneficiary or for a dedicated purpose, such as a "for the benefit of" instruction whereby the electronic transfer is directed to a specified third party account and to be used for a named third party or purpose.

The utility of being able to establish multiple distinct, electronic augmentations that are applied in a consistent manner is illustrated with the following simplified, non-limiting examples. In a commercial context, a business might have a brand name or a "doing-business-as" ("d/b/a") name that is different from the name of the juristic legal entity under which the business operates, such as a restaurant called "Patrick's Patties" that operates under a juristic business entity named "Patrick Family Restaurants, LLC." The business might have multiple accounts with a provider that are each titled in the juristic entity name. Further, each account can have different authorized users, such as a first "owner" account having the business owner as the only authorized user and a second "operating" account having two managerial employees as authorized users.

In the above example, third parties might regularly initiate transfers through prepared transfer instruments that specify "Patrick's Patties" (i.e., the "d/b/a" name) as the transfer recipient even though the accounts are titled under the name "Patrick Family Restaurants, LLC" (i.e., the juristic entity name). When processing a transfer instrument, a provider is often not able to determine the proper recipient if the recipient named in the transfer instrument does not match how an account is titled. Moreover, when utilizing conventional marking techniques, some users such as the managerial employees in the foregoing example, might not appreciate that accounts are titled under a different name than the d/b/a name specified in the transfer instrument. Thus, to ensure transfers are properly routed, standardized electronic augmentations can be established that specify the transfer receipt as "Patrick Family Restaurant, LLC d/b/a Patrick's Patties"—i.e., a marking that links the recipient named in the transfer instrument to the name in which the provide products are titled. The standardized electronic augmentations are automatically applied to the transfer instruments thereby reducing or eliminating potential errors when identifying the transfer recipient.

As a further example, the above business can establish at least two standardized electronic augmentations corresponding to the two accounts. That is, a first electronic augmentation for the owner account can include a product identifier associated with the owner account, and a second electronic augmentation can include a product identifier that is associated with the second, operating account. When applying electronic augmentations to the transfer instrument, a user can apply an electronic augmentation that specifies the desired destination account or provider protect.

With regard to permissions, the above business can specify role data that limits the electronic augmentations that the two managerial employees are authorized to apply to transfer instruments. The identity of the managerial employees is ascertained from authentication data or system configuration data used to authenticate the managerial employees and their computing devices when accessing the provider system. As an example, the managerial employee's unique user identifications can be associated with role data and transfer role data in the augmentation settings database that allows the managerial employees to only specify "for deposit only" transfer instructions and to only specify the "operating account" as a recipient account. Thus, when the managerial employees initiating and authorizing electronic transfers, the system performs a role data check and automatically generates and applies electronic augmentations associated with restrictive "for deposit only" transfer instructions and the operating account product identification. On the other hand, the owner in the foregoing example may not be restricted with regard to applying electronic augmentations.

To establish one or more electronic augmentations, users navigate to a Augmentation Settings GUI that receives augmentation settings data from users that is used to create electronic augmentations. Augmentation settings data can include, without limitation: (i) digital signature data, which can be an image of a handwritten marking or a series of alphanumeric characters or symbols used to identify an user and that serve as a user authorization input; (ii) a product identification (e.g., an account number or name); (iii) user contact data, such as a mailing address, a geographic region designating the user's principal location (e.g., a zip code, city, state), an email address, or telephone number; (iv) authorized user identification data, such as a name, user name, or identification number that identifies users authorized to apply electronic augmentations; (v) role data indicating the actions an user is permitted to take, such as applying certain electronic augmentations that contain transfer instructions; (vi) transfer instruction data that designates how an electronic transfer should be processed; and (vii) marking instruction data that can establish restrictions and rules for how electronic augmentations are applied to a transfer instrument, such as applying a particular electronic augmentation to transfer instruments originating from a particular transfer source identification.

The augmentation settings data is used to generate electronic augmentation data that is used to generate the electronic augmentation. The electronic augmentation data can include, without limitation: (i) digital signature data; (ii) a product identification; (iii) user contact data; (iv) authorized user identification data; and (v) transfer instruction data. The Augmentation Settings GUI can also be used to establish input settings used to create dynamic augmentation data. The dynamic augmentation marking data is used to generated electronic augmentations that can change with each instance an electronic augmentation is created and applied to a transfer instrument. For example, users can input settings that cause the system to generate augmentation marking data that includes a date, time, or geolocation for each instance when a electronic augmentation is created. In this manner, the system can track when an electronic augmentation was created and applied to a transfer instrument and where the user computing device was located, according to data captured from an integrated GPS device.

The augmentation settings data is stored to the augmentation settings database on the provider system for use in generating augmentation marking data. The augmentation marking data is in turn used to generate electronic augmentations that are applied to, added to, or associated with, digital transfer instruments. The augmentation marking data can be applied to a digital transfer instrument by, for example, creating metadata that is appended to the file(s) representing the transfer instruments. Or alternatively, the augmentation marking data can be used to create a separate metadata file that is associated with the file(s) representing the transfer instruments. The augmentation marking data is converted to a human-readable electronic augmentations, such as alphanumeric text or symbols, by, for instance, mapping alphanumeric characters in the augmentation marking data to matrices of pixels that represent an image of the character to be rendered on a display device.

Initiating and Authorizing Electronic Transfers

Figure 2:
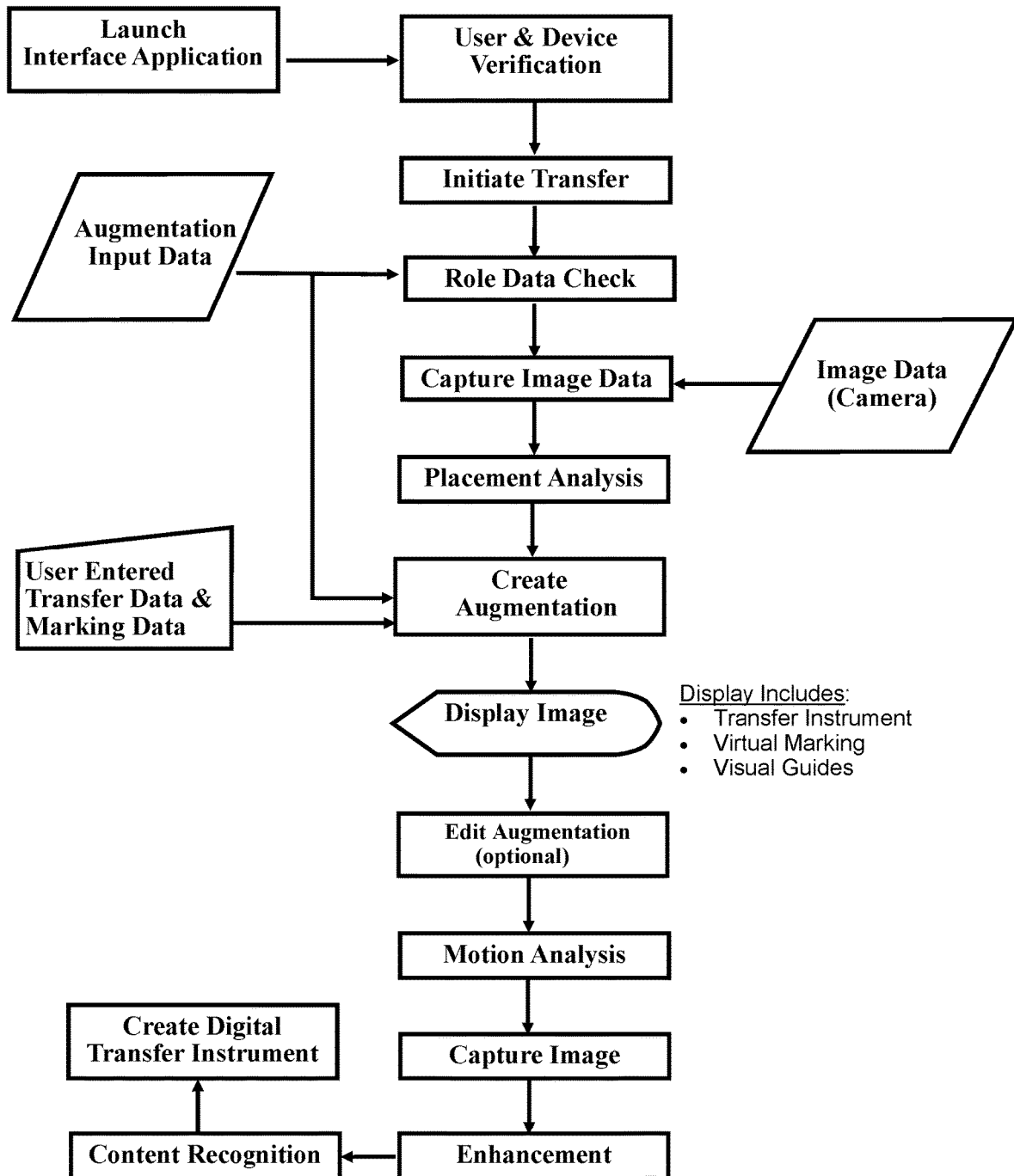
FIG. 2 is an example process according to one embodiment.

An example process for initiating and authorizing an electronic transfer is shown in FIG. 2. User may receive one or more physical or digital transfer instruments from third party transfer sources. The transfer instruments include transfer data that is processed by the provider to execute a transfer of resources from the third party transfer source to the user. The transfer instrument is reviewed, processed, and authorized by a user prior to initiating the transfer. Processing the transfer instrument includes performing operations that validate the transfer data and apply electronic augmentations that serve as a transfer authorization and that includes transfer instruction data used by the provider to implement the transfer.

The transfer data included within the transfer instrument can include, without limitation: (i) source identification data that names or identifies the source of the resource transfer; (ii) sequencing data, such as a date that the transfer instrument was created or data that otherwise indicates an order or sequence in which the transfer instrument was created relative to other transfers and transfer instruments; (iii) recipient identification data that names or identifies the user receiving the transfer; (iv) transfer value data that represents the amount or volume of resources being transferred; (v) a source signature, such as a handwritten marking or a series of alphanumeric characters or symbols used to identify the third party transfer source and that serves as a designation that the transfer is authorized by the third party; (vi) source contact data, such as a mailing address, phone number, or email address of the third party source; (vii) source provider identification data that names or identifies a provider that renders services to the third party transfer source in implementing the transfer; (viii) a transfer instrument identification, which can be an alphanumeric string of characters that is unique to the transfer instrument (e.g., a document identification number); (ix) routing data used to route the transfer from the transfer source provider to the recipient user provider; (x) a source product identifier (e.g., an account number for the transfer source); and (xi) a notation data that can be alphanumeric textual content generated by the third party transfer source, such as a short narrative describing the purpose of the transfer.

Figure 3:
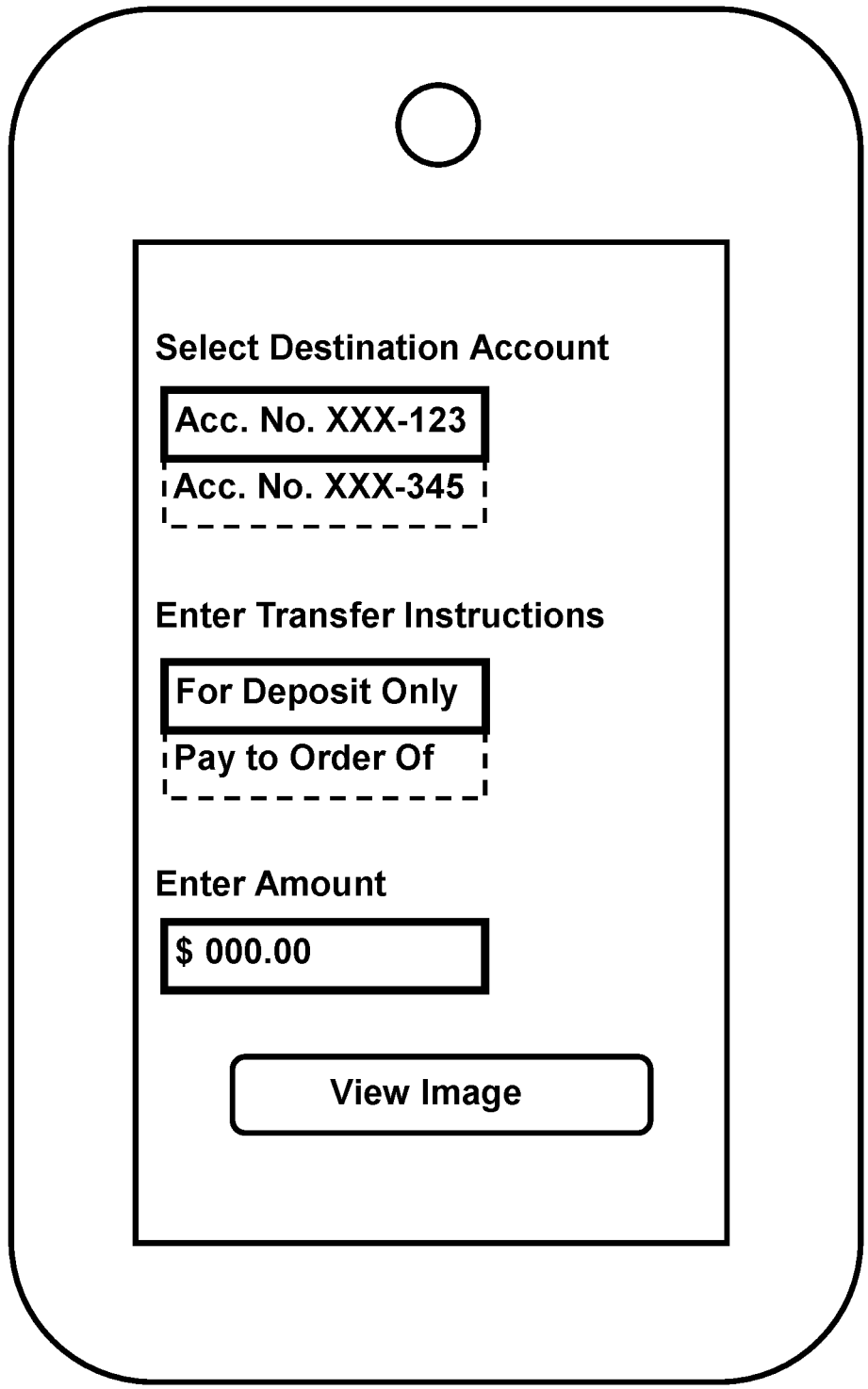
FIG. 3 is an example user interface according to one embodiment.

The user can initiate and authorize a transfer by first launching a software application, such as a Provider Interface Application, that establishes a secure connection to the provider system. The user computing device generates one or more GUIs, such as the GUI shown in FIG. 3 that include augmentation input functions selectable by users, such as pull down menus, radio buttons, or text boxes. Users can enter augmentation input selection data into the augmentation input functions to enter transfer data or augmentation data prior to digitizing the transfer instrument. At least one of the GUIs includes an image capture input function, such as the Image Capture button shown in FIG. 4. Selecting the image capture input function causes the user computing device to activate a digital camera or "image source" to capture an image that is used to digitize the transfer instrument.

The transfer instrument can be digitized with the user computing device by, for example, capturing one or more images of the transfer instrument using the digital camera. In other embodiments, image sources other than cameras can be used, such as electronic document scanners that generate transfer instrument content data as an image file, portable document format ("PDF") file, or other digitized format. Each transfer instrument content file, or source image data, can depict a different portion or side of the transfer instrument (e.g., front and back) to capture all available transfer data for conversion to a digital format. The camera or other image source device can be integrated with the user computing device or connected as a separate device, such as a scanner or a portable digital camera that is in signal communication with the user computing device through a USB or other suitable cable or through a wireless connection, such Bluetooth® or NFC.

The image source device generates source image data that is processed by one or more software applications integrated with the user computing device, such as an Image Processing Module. The source image data is processed to implement functions that include, without limitation: (i) performing a content recognition analysis that determines the transfer data included within the transfer instrument through techniques such as optical character recognition ("OCR"); (ii) performing a feature recognition analysis to determine characteristics of the transfer instrument, such as physical dimensions, boundary edge locations, the location of certain transfer data elements within the transfer instrument, or a to find a suitable location for placement and display of electronic augmentations; (iii) rendering electronic augmentations as an overlays on displayed images of the transfer instrument; (iv) performing an electronic augmentations integration operation that associates, correlates, integrates, or appends the augmentation marking data with or to the transfer instrument content data for later processing by the provider; and (v) performing image enhancement operations to improve accuracy of human or machine reading of the transfer instrument, such as sharpening the image, de-skewing the image, de-speckling the image, reorienting the image, de-warping the image, converting the image to greyscale or black-and-white colorization (i.e., binarization), or adjusting the color, among other functions.

The transfer instrument content data, or source image data, can be static image data, such as when the camera captures a photographic image of the transfer instrument at an instant in time. The source image data can also be dynamic image data where the camera generates a continuous feed of image data (i.e., sequential frames) rendered on a display device that is integrated with the user computing device (i.e., a video stream depicting the transfer instrument displayed on a touch screen). Providing a continuous stream of dynamic image data allows the user to align the camera with the transfer instrument before capturing an image. Better alignment of the camera and the transfer instrument helps ensure that the augmentation content data represents a more accurate and complete depiction of the transfer instrument, including any transfer data within the transfer instrument.

Figure 4:
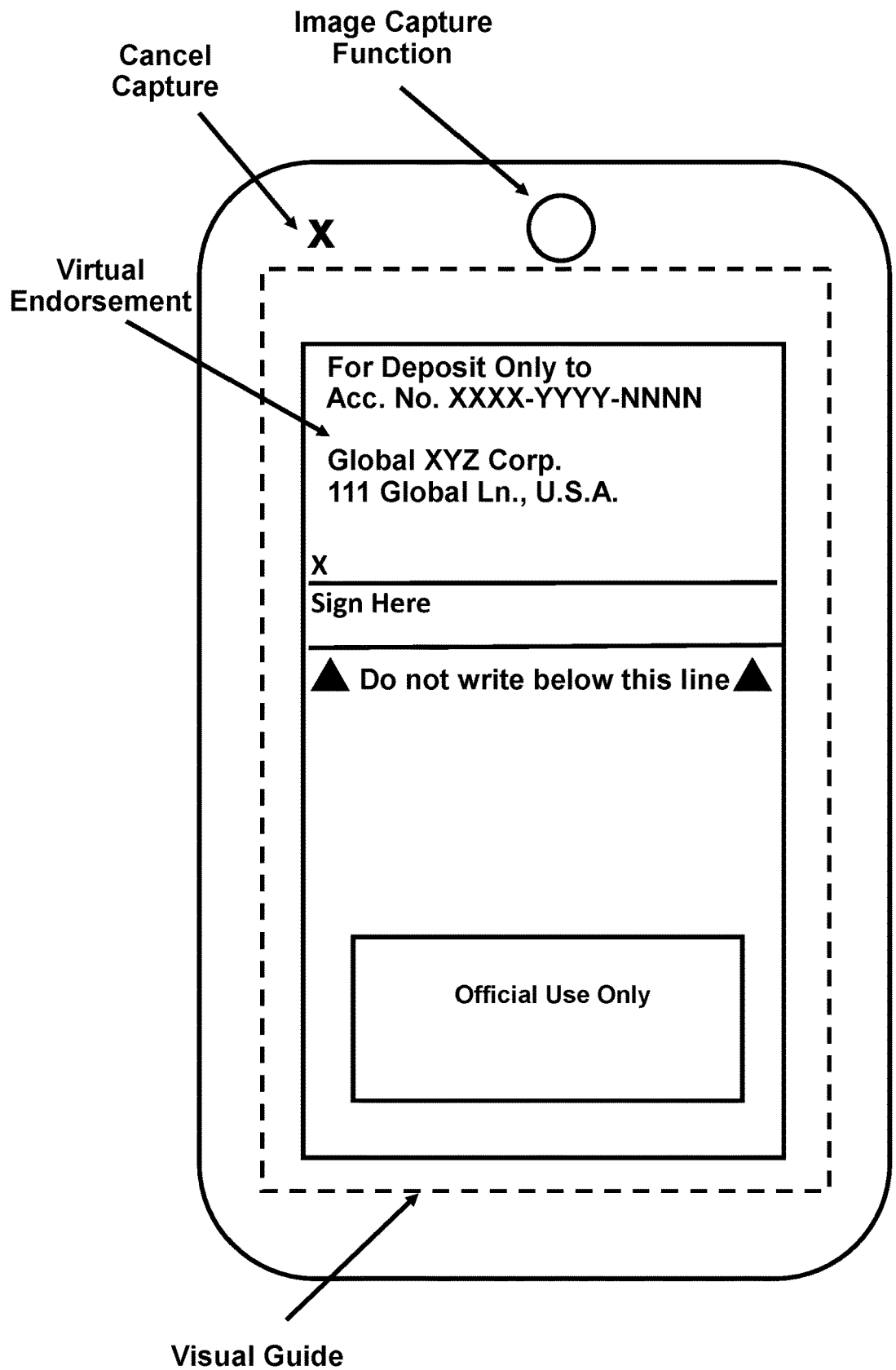
FIG. 4 is an example user interface for image capture and showing electronic augmentations according to one embodiment.

When capturing an image, the user computing device display can be configured to render a visual guide, such as a box, outline, or partial corners of a rectangle shown in FIG. 4. Users align the visual guide with the transfer instrument shown on the computing device display, such as placing the transfer instrument within the visual guide, before selecting an image capture function to generate source image data representing a still image of the transfer instrument. The visual guides help ensure optimal orientation of the transfer instrument within the image and also help ensure that the camera is an optimal distance from the transfer instrument.

Optimizing the distance between the camera and the transfer instrument results in the transfer instrument occupying a desired proportion of the overall image size, such as locating the edges of the transfer instrument a pre-determined number of pixels away from each side boundary of the image. The Image Processing Module can then more efficiently crop the image to eliminate pixels that are located near the boundaries of the image and outside the edges of the transfer instrument. Cropping the image reduces the size of the image data file for faster transmission over a network and eliminates potential background "noise" near the edges of the image that could interfere with subsequent image processing and possibly be mistaken for transfer data.

Any suitable edge detection techniques can be employed to determine the edges of the transfer instrument and to facilitate image cropping. Edge detection can be utilized both before and after capturing an image of the transfer instrument. Before capturing an image, if all edges of the transfer instrument are not detected within the image data, the user computing device can display a notification or an indicator to the user notifying the user that the entirety of transfer instrument might not be within the boundaries of the image. Similarly, if all edges of the transfer instrument are not detected within a captured image, the user computing device can display a notification to the user and prompt the user to capture a replacement image.

To perform edge detection, in one embodiment, the Image Processing Module first converts the image to black and white pixels with each pixel having position data (e.g., X-Y coordinates) and a brightness value indicating how light or how dark the pixel is to be displayed. The Image Processing Module analyzes adjacent rows and columns of pixels to determine abrupt changes in the brightness values that represent edges of the transfer instrument. The Image Processing Module can streamline the edge detection process by starting the analysis at locations where edges are expected, such as positions proximal to the visual guide locations or positions located a certain number of pixels away from the edge of the image.

In one example of edge detection, three locations where edges are expected are examined to find a top left corner, a top right corner, and a bottom edge of the transfer instrument. For each of the corners or edges that are detected, a byte array is created, a histogram of the array is generated, and a binary black-and-white image is generated so that a horizontal line can be found for each of the top left corner, top right corner, and bottom edge. Similar operations are used to determine a vertical line for the top left and right corners. Following edge detection, the Image Processing Module can analyze the image data to ensure that the entire transfer instrument was captured within the image boundaries.

The user computing device or provider terminal that is being used to capture the image can also utilize anti-motion techniques to help ensure the image source device or camera is steady as images of the transfer instrument are captured. The result is a more sharp and more clear image. Any suitable anti-motion techniques can be utilized. In one example embodiment, an edge detection analysis is performed on successive image frames captured by the camera (e.g., every frame, every other frame, or every "x" number of frames to reduce processing requirements). If the edge detection analysis indicates that the locations of transfer instrument edges change by a predetermined threshold from one frame to the next (e.g., change by more than "x" number of pixels), the change is interpreted as unacceptable camera movement that could result in a poor image quality. The user computing device can then disable the image capture input function until movement falls within acceptable limits or display a notification to the user that camera movement should be eliminated as the movement could result in reduced image quality.

In yet another embodiment, the user computing device can include an integrated accelerometer that outputs positional data at periodic intervals of time. Changes in the positional data above a certain threshold can be interpreted as unacceptable camera movement that could result in a poor image quality. Again, the user computing device can then disable the image capture input function until movement falls within acceptable limits (e.g., the position data does not change above a predetermined threshold for a predetermined amount of time), or the user computing device can display a notification to the user recommending that camera the movement be reduced.

Once an image is captured, the image data can be converted and/or stored in one or more suitable image data formats, such as a Joint Photographic Experts Group ("JPEG") compliant format, a tabbed image file ("TIFF") format, a bitmap format, or a Scalable Vector Graphics ("SVG") image format. In some embodiments, the camera device captures images in a first image data format, such as JPEG, that is then converted to another format with a smaller file size to facilitate transmission of the image data between computing devices. The provider computing system may convert the image data representing the transfer instrument into a binary interchange format, such as the DSTU X9.37-2003 file format, prior to transmitting the digitized transfer instrument to a third party, such as an automated clearing house.

Those of skill in the art will recognize that capturing an image is not the only method available for digitizing a physical transfer instrument. In other embodiments, the transfer instrument can be digitized in whole or in part using a document scanner or by entering transfer data into a GUI. For instance, a user can manually enter transfer data read from the transfer instrument into a GUI, and the system can generate file(s) that represent the transfer instrument, such as a data file (e.g., a .dat file), a hypertext language markup file (e.g., a html or xml file), a comma-separated value file (e.g., a .csv file), a portable document format file (e.g., a PDF file), or a template/standardized image representing a transfer instrument (e.g., a JPEG or TIFF image resembling generic check).

A hybrid of digitization methods can be used where, for example, not all of the transfer data can be determined by analyzing an image of the transfer instrument. In that case, the computing device display can generate and show a notification to the user stating that one or more elements of the transfer data could be not determined from the image if, for example, the transfer instrument is folded or damaged in a manner that conceals transfer data or handwritten transfer data is of poor quality and cannot be read. The computing device can also render a GUI that allows the user to input missing transfer data.

The system (i.e., a user computing device, provider terminal computing device, or a provider network computing device) can process source image data using a content recognition analysis to conduct an initial assessment regarding the quality of a digital image showing a transfer instrument. In particular, the initial assessment can determine readability of the transfer data contained on the transfer instrument. For example, the system can determine whether the product identification, the transfer value data, or other transfer data is readable such that it may be parsed or otherwise obtained and processed by the provider to execute the transfer. The initial quality assessment can be performed after a user captures all required images of the transfer instrument. If the quality is confirmed, the user is prompted to confirm that the transaction is authorized and that electronic augmentations applied to the image are correct. Alternatively, the initial quality assessment can be performed after a first image of the transfer instrument is generated (i.e., a front side of the transfer instrument), and if the quality is confirmed as acceptable, the user computing device can generate a prompt instructing the user to capture a subsequent image of the transfer instrument (e.g., the back side of the transfer instrument).

To ensure human and machine readability of the image data, the Image Processing Module can perform one or more image enhancement operations. The enhancement operations can improve the accuracy of subsequent feature recognition or content recognition analyses that employs techniques such as edge detection, OCR, magnetic ink character recognition ("MICR"), courtesy amount recognition ("CAR"), or legal amount recognition ("LAR").

Enhancement operations include, but are not limited to, one or more of the following functions: (i) de-skewing an image where the edges of the transfer instrument are rotated relative to the boundaries of the image (i.e., re-orienting the transfer instrument image to better align with the image boundaries); (ii) de-warping the image when the transfer instrument is tilted or folded such that some portions of the transfer instrument are closer to the camera than other portions (i.e., modifying portions of the transfer instrument image so that the transfer instrument appears to be perpendicular to the camera lens); (iii) binarization to convert the image to black-and-white pixels; (iv) de-speckling to remove positive and negative spots and to smooth edges present in the image; (v) line removal to eliminate non-glyph lines or shapes (i.e., shapes that do not form part of a character, such as inadvertent pen strokes); (vi) cropping pixels or portions of an image outside of the transfer instrument; (vii) down-sizing the image to a more suitable dots-per-square-inch ("DPI") size that is more efficient to process and transmit over a network; (viii) character segmentation to separate individual characters that might be linked by artifacts in an image (e.g., a hand-written cursive word that links characters, a user-inserted hyphen, or a stain or dark spot between characters that appears to improperly connect the characters); (ix) line and word detection; and (x) script recognition to detect characters unique to particular fonts or languages that can be more efficiently compared against a known database of characters of the same language or font to identify the characters.

With respect to de-skewing, de-warping, and de-speckling operations, the Image Processing Module can employ techniques such as: (i) convex-hull algorithms that create a smooth polygon around the transfer instrument image and remove concavities; or (ii) a rotating calipers algorithm that determines the tightest fitting rectangle around the transfer instrument edges that can be used to determine the orientation angle of the transfer instrument to better align the transfer instrument with the image boundaries.

Following image enhancement operations, the Image Processing Module processes the image data that represents the transfer instrument using a content recognition analysis. The content recognition analysis locates and identifies the human-readable characters on the transfer instrument that form the transfer data. The content recognition analysis can employ OCR processing techniques that generally include two primary methods: (i) component detection that defines a character by evaluating individual components such as lines and strokes; and (ii) pattern recognition that identifies entire characters.

The first step in OCR analysis is typically to convert image data to black-and-white pixels that are represented by a two-dimensional matrix. Within the matrix, a "1" denotes a black pixel, and a "0" denotes a white pixel. The Image Processing Module identifies regions of the matrix that represent a character, and segments the matrix regions surrounding a character into sub-region segments. The Image Processing Module compares each matrix sub-region segment to a database of matrices representing characters with different fonts. The comparisons are used to identify a character that the matrices most resemble statistically.

Figure 5:
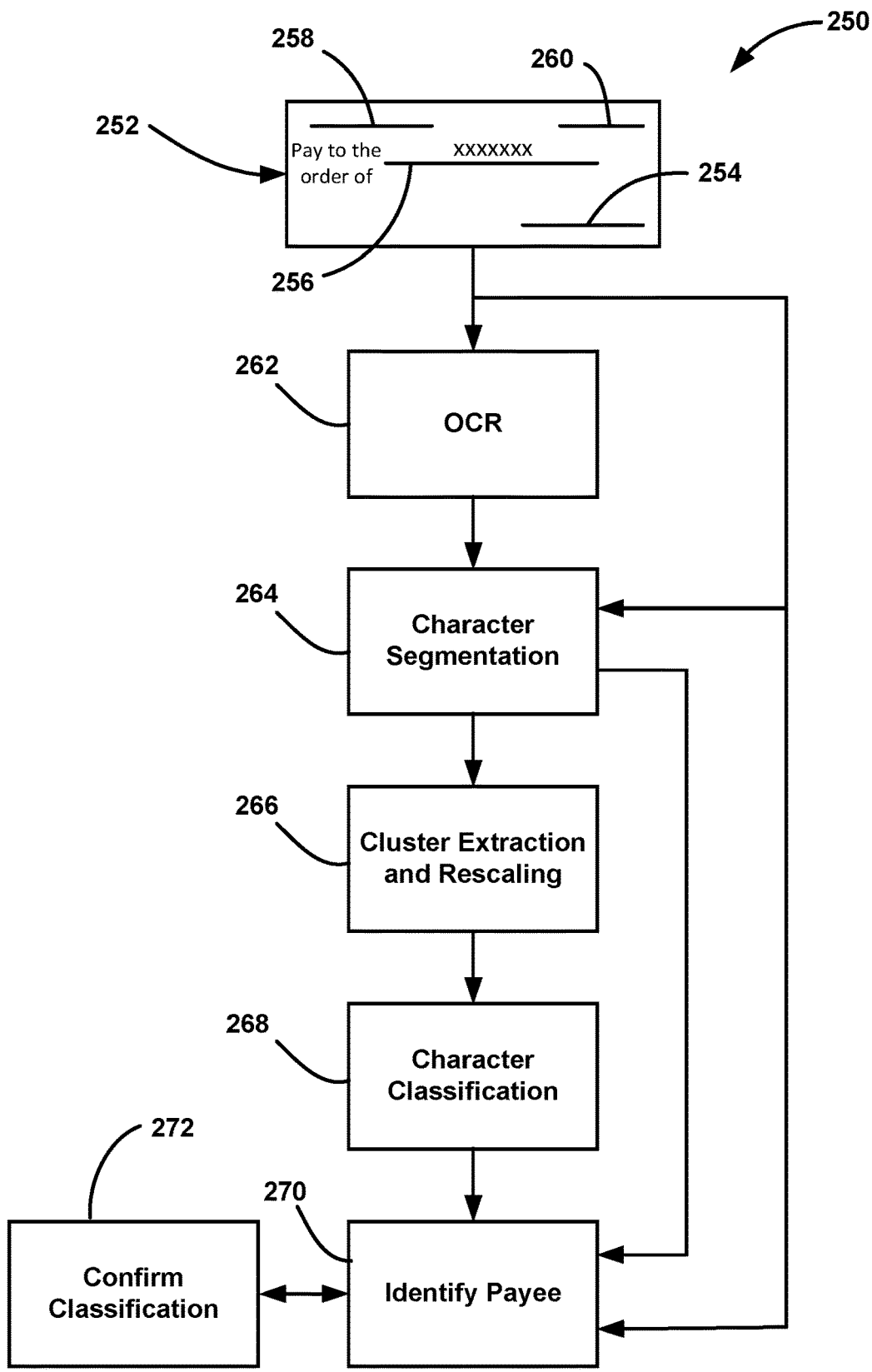
FIG. 5 is an example process for content recognition according to one embodiment.

In another embodiment, the Image Processing Module uses clustering analysis to perform OCR and identify characters. FIG. 5 depicts a flow diagram illustrating a process for identifying handwritten characters in an image. The transfer instrument includes a signature line 256, a line for source identification data 258, and a sequence data line 260 (i.e., a date), among other data fields. The images are subject to OCR processing at step 262 that reads and converts typed and/or printed text on the image 252 into machine-encoded text.

One suitable algorithm for this purpose is TESSERACT available through the PYTHON software suite. Such OCR algorithms read and convert typed text in the image 252 with a high degree of accuracy, but the algorithms may not always reliably read and convert handwritten text on a transfer instrument. An example of handwritten text is shown as the transfer instruction "pay to the order of" positioned next to the source identification data line 256 of the transfer instrument. The OCR algorithm is programmed to identify the expected location of the certain characters in the image or other suitable typed text in the image 252, such as recognizing that sequencing data generally appears to the right of printed text stating "date" or that source identification data generally appears in the upper left portion of an image.

The image 252 can be subjected to a density-based clustering algorithm that provides character segmentation at step 264 that also receives the location of the recipient identification data line 256 in the image 252. The image data can be converted to black and white with a "1" representing a non-white pixel and a "0" representing a white pixel. The clustering algorithm identifies clusters of non-white pixels in the area of the image 252 identified by the OCR algorithm. Each separately identified cluster may be, for instance, a handwritten character that is part of the source identification data that is handwritten proximate to line 256.

The section of the image 252 being examined is processed as a matrix of pixels where each non-white pixel is considered a data point for the clustering process. One suitable density-based clustering algorithm is Density-Based Spatial Clustering of Applications with Noise ("DBScan"), which is a density-based clustering non-parametric algorithm. Given a set of points in a set space, the DBScan algorithm groups together pixels that are closely packed together (i.e., non-white pixels with many nearby neighbors that are also non-white pixels). The algorithm also marks as outliers points that lie alone in low-density regions whose nearest neighbors are too far away (i.e., a pixel distance above a predetermined threshold). The output of the clustering algorithm is a dataset array that digitally identifies the X and Y coordinates of the pixels in each identified character cluster along with an assigned label for each cluster where the algorithm will assign the same cluster label to data points that are part of the same cluster.

The clustering algorithm is effective for identifying clusters of pixels in the image 252 that are part of the same character. However, some letters, such as, for example, capital "I," may look like two clusters to the algorithm because of the top and bottom bars in the letter. Handwriting heuristics can be employed to add constraints to the clustering algorithm to reduce the probability that more than one cluster dataset array is identified for the same character and/or one cluster dataset includes more than one character. For example, since the source identification data will be written from left to right on the transfer instrument, the clustering algorithm could be designed with a constraint where clusters cannot be stacked top to bottom on the transfer instrument relative to the handwriting direction of the source identification data. In other words, if two clusters are identified in a vertical direction at the same left to right location on the image 252, then that cluster can be considered a single cluster for one character.

Further, a limit to the size or area of the cluster can also be employed as a useful constraint. For instance, if the size of the cluster exceeds a predetermined threshold, then the Image Processing Module denotes the cluster as including more than one character. In that case, the Image Processing Module processes the group of pixels as comprising multiple clusters and characters. In other words, a constraint can be employed that limits the size of each cluster to be less than a predetermined maximum size. Also, a person will typically write in a manner where all of the characters are about the same size or width. If there is a significant inconsistency in the size of the clusters, then the cluster process can be further refined to identify additional clusters. In other words, a constraint can be employed that requires all of the clusters to be within a certain percentage size of each other.

The dataset array from the clustering algorithm is provided to a cluster extraction and rescaling algorithm at step 266 that extracts the individually identified clusters in the dataset array into individual dataset arrays and rescales each individual dataset array into, for example, a twenty-eight by twenty-eight (28×28) pixel cluster image, using extrapolation, which retains the main features of the image 252. The rescaling process also centers the cluster in the cluster image and adds border padding.

Figure 6:
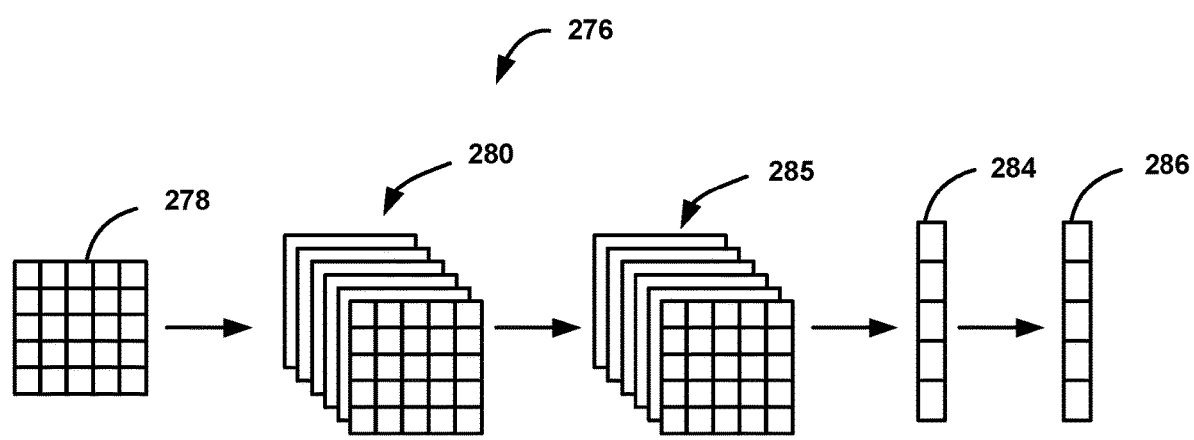
FIG. 6 is an illustration of a neural network that can be used in a character classification model.

Each individual cluster image 274 is provided to a character classification model at box 268 that classifies the likelihood that each cluster image 274 is a particular character. The classification model employs a neural network, such as convolutional neural network 276 shown in FIG. 6. The neural network 276 includes an input layer 278 that receives the cluster image 274, a convolutional layer 280 that classifies the image 274, a pooling layer 282 that reduces the dimensions of feature maps, a fully connected layer 284 that connects the nodes between layers, and an output layer 286 that outputs the classified characters.

The neural network 276 can be trained using a known set of training images, where each training image illustrates a letter or a number that has been assigned one of sixty-two character classes, namely, the upper case letters A-Z, the lower case letters a-z, and the numbers 0-9. The nodes in the neural network 276 are weighted, and those weights are tuned during the training process to allow the neural network 276 to determine what locations in the image 274 include non-white pixels of a particular character. The training process first feeds the neural network 276 character training images of known character values. Then the neural network 276 is fed character training images without identifying the characters. The node weights are adjusted based on correct character identification answers and incorrect character identification answers. The known set of training images could be the EMNIST™ dataset, which is a set of 697,932 handwritten character digits derived from the NIST Special Database 19 and converted to a 28 by 28 pixel image format and dataset structure.

During operation, the neural network 276 determines the likelihood that each image 274 is each of the sixty-two characters, and selects the character with the highest likelihood as the character for that image 274. The classification model outputs a string of characters from left to right along the source identification data line 256, for example, and identifies spaces between certain characters where non-white pixels do not exist as an indication of a separation between words. The classification model can employ any algorithm suitable for the purposes described herein, such as PYTORCH clustering, which is an open source machine learning framework used for applications such as computer vision and natural language processing.

In some embodiments, the content recognition analysis can rely in part on MICR techniques. The MICR techniques generally require a dedicated magnetic reader device that is integrated with, or in signal communication with, the user computing device or provider terminal computing device. Portions of a transfer instrument can include characters printed or generated with magnetic ink or toner that are detected by the magnetic reader device to identify characters.

After performing content recognition and feature detection analyses, the system can perform an error detection analysis to detect potential errors in the transfer data. For example, the content recognition analysis might determine that the source identification data has a value of "customer 1" and the transfer value data yields a value of "$10." The user computing device can display a GUI that prompts the user to enter expected source identification data and expected transfer value data. The system compares the expected values against the values determined through the content recognition analysis. A match between the user-entered expected data values and the determined data values is taken as an indicator that the transfer data was properly determined through the content recognition analysis. If the expected data values and the determined data values do not match, the transfer can be automatically terminated, or the user can be notified and prompted to confirm whether the transfer is still authorized.

The error detection analysis can also be configured to verify the presence of particular features within the image data representing the transfer instrument. To illustrate with a simplified example, it might be known that a particular type of transfer instrument must include routing data both in the lower left of a first (front) side of the transfer instrument and in the upper left of a second (back) side of the transfer instrument. Further, it might be known that the routing data must include nine (9) numeric characters. If the content recognition and feature detection analyses do not identify nine (9) numeric characters in the expected locations, the user computing device can notify the user that the transfer cannot be completed, or query the user to capture new images.

Continuing with the foregoing example, the user computing device can be configured to specifically prompt the user to capture a first image of the first/front side of the transfer instrument and then next capture a second image of the second/back side of the transfer instrument. If the content recognition and feature detection analyses determine that the first image includes a nine (9) digit numeric value in the upper right of the image (where the value was expected in the lower right), then the user computing device can display a notification to the user that the order of the image captures might have been reversed.

Following content recognition and error detection, the system can apply an electronic augmentation to the transfer instrument by both: (i) appending, associating, or correlating augmentation marking data with or to file(s) representing the digitized transfer instrument; and (ii) rendering an electronic augmentation on an image of the transfer instrument that is shown on the display of the user computing device. The electronic augmentation can be automatically applied based on the previously entered augmentation settings data stored to the augmentation settings database. In some embodiments, the an electronic augmentation and augmentation marking data can be generated by also utilizing augmentation settings data entered by a user or captured from the user computing device at or near the time that the transfer instrument is digitized.

When rendering the an electronic augmentation on the transfer instrument image, the system can perform a positioning analysis to determine a proper location to place and display the an electronic augmentation. The position analysis can utilize a combination of edge detection techniques, feature recognition analysis, and content recognition analysis. In some cases, providers or third parties that process an electronic transfer instrument (e.g., an automated clearing house) may require that a an electronic augmentation be placed at or near a specific position on the transfer instrument. The position analysis identifies and determines the location of relative marking characters, such as particular alpha numeric characters that serve as a marker for a position where an electronic augmentation should be applied.

The electronic augmentation position can be denoted by symbols or alphanumeric text on the transfer instrument, such as an "X" adjacent to an elongated line (e.g., "X_____"), text stating "mark here," an elongated line near text stating "do not mark below this line," or another suitable position designation. It might also be known that a required an electronic augmentation position is generally located on a first or second side of the transfer instrument and in a specific position, such as approximately "X" number of pixels away from an edge of the transfer instrument. The example shown in FIG. 4 illustrates an embodiment where the required position is located on a second side of the transfer image near two arrows and text stating "do not mark below this line."

In the foregoing examples, the Image Processing Module performs a placement analysis to determine placement data that corresponds to a location for the placement of an electronic augmentation on the image. The placement analysis can use an edge detection analysis to determine the positions near the edge of the transfer instrument. The edge detection analysis can be streamlined by, for example, examining an expected position that is a certain number of pixels away from the left boundary of the image data.

The Image Processing Module can perform content recognition as part of the placement analysis to locate specific characters, such as text stating "mark here." In this manner, augmentation placement data is generated corresponding to approximate X-Y position for placing the electronic augmentation on the image can be determined. The placement data can comprise a center point, corner, or another starting point position where the electronic augmentation will be located as well as an array of pixels that correspond to a span of the electronic augmentation. When the user computing device displays dynamic image data, the placement analysis can be performed on successive image frames (e.g., every image frame, or every third image frame, etc.), to generate updated augmentation placement data. Updating the virtual augmentation placement data ensures the electronic augmentation is shown in an approximately consistent position on the user computing device display relative to the image depicting the transfer instrument.

The augmentation image data is generated from augmentation settings data stored to the augmentation settings database on a remote system, such as the provider system or a third-party SaaS or cloud service provider. The electronic augmentation can also be generated using augmentation selection data input by a user.

The user computing device or terminal computing device receive the augmentation marking data transmitted from the remote system in any suitable file format known to those of skill in the art, such as a metadata file, a PDF file, a XML, a HTML file, or a text file (e.g., a .txt file), among other potential formats. The user or terminal computing device can generate image data comprising the augmentation marking data (i.e., the electronic augmentation) by converting the augmentation marking data into an array of pixels using a database that maps specific characters into pixel matrices readable as image data. Alternatively, the augmentation marking data to image data conversion can be performed by the remote computing system, and the converted image data is transmitted to the user or terminal computing device as an image file of any suitable format (e.g., a JPEG file, TIFF file, etc.).

The electronic augmentation can be rendered on the user computing device display as being overlaid onto the transfer instrument in a manner that does not destroy, conceal, or significantly alter the underlying content. This function, referred to herein as augmentation interference reduction, can be accomplished using one or a combination of techniques that include selective placement of the electronic augmentation, adjusting the resolution of the electronic augmentation, adjusting the colorization of the electronic augmentation, or adjusting the opacity of the electronic augmentation.

Augmentation interference reduction can be done prior to image capture while users are positioning a camera relative to the transfer instrument. Thus, users have an opportunity to view the underlying transfer instrument and the electronic augmentation in a manner that allows users to adjust the electronic augmentation position if the electronic augmentation is obscuring or interference with the underlying transfer instrument image. For instance, the electronic augmentation can be displayed as partially opaque thereby allowing users to still view and read any underlying transfer data on the transfer instrument. If the transfer data is obscured, users can adjust the camera position to adjust the electronic augmentation position. Alternatively, some embodiments can allow users to select the electronic augmentation with a mouse pointer or finger (for touch screen displays) and to adjust the position of the electronic augmentation on the display. After adjusting the electronic augmentation position, users can proceed with capturing a still image of the transfer image.

Users can also be provided with functions that permit augmentation interference reduction after an image is captured. Again, users can be provided with a function that permits selection and repositioning of the electronic augmentation on the still image prior to authoring the transfer and completing the process of digitizing the transfer instrument. The system can also provide input functions that allow users to adjust the color, opacity, or resolution of the electronic augmentation and view the resulting composite image of the electronic augmentation overlaid on the transfer image. This feature allows users to maximize readability of the electronic augmentation and the transfer instrument prior to completing the digitization process.

In one embodiment, the placement analysis that includes a content recognition analysis and feature recognition analysis are used to identify positions within the transfer instrument image that do not contain transfer data or other content that might be concealed by applying a electronic augmentation to that particular location. The system determines an approximate size for the electronic augmentation, such as fitting the electronic augmentation within a pixel matrix having a particular width and height. Once the approximate position for placing the electronic augmentation is determined according to the methods described above, the Image Processing Module examines nearby pixels within the expected pixel span of the electronic augmentation matrix to determine (i) whether non-white pixel clusters fall within the expected pixel span, and (ii) whether any non-white pixel clusters within the expected span correlate to transfer data or other content that should not be concealed or altered. If the Image Processing Module does, in fact, recognize non-white pixel clusters within the expected pixel span of the electronic augmentation, the Image Processing Module can select an alternate position for the electronic augmentation to minimizes or eliminates interference with detected non-white pixel clusters.

In another embodiment, the system can also minimize interference with transfer instrument content by rendering the electronic augmentation at a different, and generally lower, resolution than the image of the transfer instrument. A lower resolution can be one that is at least a threshold level less than the image resolution for the transfer instrument, such as rendering the electronic augmentation at a resolution that is 10% less, 20% less, or another percentage suitable to render the electronic augmentation on the transfer instrument without interfering with any transfer instrument content. As an example, the resolution of the transfer instrument image can be 100 DPI, and the electronic augmentation can be rendered at a resolution of 20% less, or 80 DPI, so as to distinguish the electronic augmentation from the transfer instrument without concealing any underlying content on the transfer instrument.

Additional techniques for minimizing interference between the electronic augmentation and the transfer instrument content include selective colorization of the electronic augmentation. For example, the color of the electronic augmentation can be selected to ensure a distinction or contrast between the electronic augmentation and the underlying transfer instrument, which can minimizes interference and enhance readability of the electronic augmentation. That is, the Image Processing Module can identify a background colorization and brightness of the transfer instrument image, and the electronic augmentation can be rendered in a color that is distinct or contrasted from the transfer instrument image. Selection of the electronic augmentation color can include rendering the electronic augmentation with pixels having brightness levels that are less than a predetermined threshold (if the transfer instrument image is dark in color) or greater than a predetermined threshold (if the transfer instrument is white or light in color). As another example, the electronic augmentation color can be selected based on specific detected background colors, such as selecting a red electronic augmentation color when the background color is predominantly green or blue.

Another technique for minimizing image interference can include rendering the electronic augmentation with an opacity that permits the electronic augmentation to appear partially transparent so that users can see the transfer instrument underneath the electronic augmentation. A 1% opacity can correspond to a nearly transparent image where 100% opacity corresponds to a completely opaque image. Opacity can be adjusted by rendering characters as a series of shapes (e.g., numerous small circles, squares, or other shapes that collectively form an alphanumeric character) rather than a continuous layer. The electronic augmentation may appear granular or pixelated but will not conceal, destroy, or alter underlying content data within the transfer instrument image. The size, spacing, color, brightness, and shape of the marking elements is selected to maximize readability of the electronic augmentation while minimizing potential interference with the underlying image.

The augmentation marking data used to create the electronic augmentation image data can be determined in part by factors discussed above, such as user identification data for the user operating the computing device or the source identification data. For instance, based on the user identification data, the augmentation marking data can include a specific product identifier that will receive the transfer, specific transfer instruction data, or specific digital signature data corresponding to the user identification data (i.e., a particular user's digital signature).

In some embodiments, the augmentation marking data can be determined in whole or in part from data input by the user at or near the time the transfer instrument is digitized. To illustrate, a user can select an "initiate transfer" input function on a GUI displayed on a user computing device. Selecting the initiate transfer function can display a GUI that prompts the user to enter transfer data or augmentation marking data, such as a product identifier or transfer instruction data. In this manner, a user can determine at the time of the electronic transfer which account will receive the transfer, and the augmentation marking data can be generated accordingly to include the proper product identification data and transfer instruction data. The system can be configured to run electronic augmentation role data checks by, for instance, analyzing role data to determine whether a user is authorized to create a marking with specified transfer instruction data before generating the electronic augmentation for display.

In other instances, the electronic augmentation can be made from automatically generated data, such as a geolocation of the user computing device, a device identification number, or an IP address for the user computing device. This allows an electronic transfer to also be identified by the computing device that was utilized to initiate an authorize the transfer. The electronic augmentation can further include a user identification or other data captured at the time a device authenticates to the provider system so that components of the electronic augmentation are automatically completed.

The electronic augmentation can be rendered as being overlaid on the transfer instrument image either prior to capturing an image or after the image is captured. That is, while a user is positioning the camera relative to the transfer instrument in preparation for capturing a still image, the user or terminal computing device display can render a continuous stream of dynamic image data showing the transfer instrument (i.e., a video). The continuous image stream can be augmented with the electronic augmentation along with the visual guide discussed above. In this manner, the user can review the accuracy of the augmentation marking data while at the same time position the electronic augmentation on the transfer instrument in a manner that does not interfere with content on the transfer instrument.

After the user selects an image capture input function to generate a still image, the computing device can display the still image of the transfer instrument with the electronic augmentation overlaid on the transfer instrument and appearing to be part of, or printed on, the transfer instrument. Thus, the user has another opportunity to review the accuracy and position of the electronic augmentation prior to authorizing the electronic transfer. After accepting the image and authorizing the transfer, the system can store the image of the transfer instrument with the electronic augmentation embedded in the image.

Conventional systems generally apply electronic augmentations after a digitized transfer instrument is transmitted to a provider or third party system for processing. Thus, errors or irregularities in the electronic augmentations may not be detected until after an electronic transfer is denied, thereby leading to further delays in transfer processing. The present systems overcomes such disadvantages by allowing users to customize and review electronic augmentations prior to authorizing an electronic transfer and transmitting the digitized transfer instrument to a provider or third party for processing. The result is a more efficient process for electronic transfers that saves time, facilitates consistency, and reduces errors in electronic transfer processing.

Although the foregoing description provides embodiments of the invention by way of example, it is envisioned that other embodiments may perform similar functions and/ or achieve similar results. Any and all such equivalent embodiments and examples are within the scope of the present invention.

What is claimed is:

1. A system for implementing and augmenting a digital instrument comprising a computing device that includes at least one processor, an integrated display device, and a memory device storing data and executable code that, when executed, cause the at least one processor to:
- communicate to the integrated display of the computing device, user-readable instructions for a capturing an image of a transfer instrument with a camera in signal communication with the computing device;
- activate the camera, wherein the camera receives an image through a camera lens and generates source image data that comprises a transfer instrument image;
- detect the transfer instrument image within the source image data,
- in response to detecting the transfer instrument image, execute a placement analysis using the source image data, wherein the placement analysis generates augmentation placement data that corresponds to a location for the placement of an electronic augmentation on the transfer instrument image, wherein the placement analysis comprises the steps of
- converting the source image data to black and white pixels with each pixel having a pixel coordinate position and a brightness value,
- segmenting the source image data into one or more regions,
- detecting boundary edges of the transfer instrument image by detecting changes in pixel brightness values above a brightness value threshold,
- processing the transfer instrument image to detect one or more dataset arrays identifying clusters of pixels,
- feeding the one or more dataset arrays to a cluster extraction analysis to identify a marking character or a marking feature within the transfer instrument image,
- selecting an augmentation starting point that is a distance from the marking character or marking feature that permits placement of the electronic augmentation such that the augmentation pixel matrix does not overlap with the marking character or marking feature; and
- generate a modified transfer instrument image by applying an electronic augmentation to the source image data by (i) converting augmentation settings data into augmentation image data, wherein the augmentation settings data comprises digital signature data, a product identification, and transfer instruction data, and (ii) displaying the source image data and the augmentation image data on the integrated display device, wherein the electronic augmentation is rendered as overlaid on the transfer instrument according to the augmentation placement data.

2. The system for implementing and augmenting a digital instrument of claim 1, wherein the computing device generates a visual guide rendered on the display device with the dynamic image data and the augmentation image data.

3. The system for implementing and augmenting a digital instrument of claim 1, wherein the electronic augmentation comprises digital signature data and transfer instruction data.

4. The system for implementing and augmenting a digital instrument of claim 1, wherein the augmentation image data is rendered on the display device as partially opaque.

5. The system for implementing and augmenting a digital instrument of claim 1, wherein the augmentation image data is rendered on the display device with a lower resolution than the source image data.

6. The system for implementing and augmenting a digital instrument of claim 1, wherein:
- the first computer determines colorization of the source image data, and
- the augmentation image data colorization is selected to create a contrast between the marking and rendered transfer instrument.

7. The system for implementing and augmenting a digital instrument of claim 1, wherein the augmentation image data is selected and repositioned on the display device by a user.

8. The system for implementing and augmenting a digital instrument of claim 1, wherein:
- the augmentation image data comprises one or more text characters; and
- the one or more text characters are edited by a user.

9. A system for implementing and augmenting a digital instrument comprising a provider computing device and an end user computing device, wherein each computing device comprises integrated software applications that, when executed, cause the computing devices to:
- execute by the provider computing device a role data check utilizing a user identification received from the end user computing device, wherein the role data check defines transfer instructions based on the user identification;
- activate camera in signal communication with the end user computing device, wherein the camera receives an image through a camera lens and generates source image data that comprises an image of a transfer instrument;
- convert by the provider computing device, augmentation settings data into augmentation image data that is transmitted to the end user computing device, wherein the augmentation settings data comprises digital signature data and transfer instruction data generated based on the role data;
- detect the transfer instrument image within the source image data;
- in response to detecting the transfer instrument image, execute a placement analysis by the end user computing device using the source image data, wherein the placement analysis generates augmentation placement data that corresponds to a location for the placement of an electronic augmentation on the transfer instrument image, and wherein the placement analysis comprises the operations of
- converting the source image data to black and white pixels with each pixel having a pixel coordinate position and a brightness value,
- segmenting the source image data into one or more regions,
- detecting boundary edges of the transfer instrument image by detecting changes in pixel brightness values above a specified brightness threshold between regions,
- processing the transfer instrument image to detect one or more dataset arrays identifying clusters of pixels,
- feeding the one or more dataset arrays to a cluster extraction analysis to identify a marking character or a marking feature within the transfer instrument image,
- selecting an augmentation starting point that is a distance from the marking character or marking feature that permits placement of the electronic augmentation such that the augmentation pixel matrix does not overlap with the marking character or marking feature; and
- generate a modified transfer instrument image by applying by the end user computing device, an electronic augmentation to the source image data by (i) converting augmentation settings data into augmentation image data, (ii) displaying the source image data and the augmentation image data on a display device integrated with the end user computing device, wherein (iii) the electronic augmentation is rendered as overlaid on the transfer instrument according to the augmentation placement data.

10. The system for implementing and augmenting a digital instrument of claim 9, wherein
the source image data comprises dynamic image data generated from a continuous stream of image data received from the image source;
the end user computing device displays the dynamic image data; and
the electronic augmentation is repositioned on the transfer instrument as the dynamic image data is displayed.

11. The system for implementing and augmenting a digital instrument of claim 10, wherein
the operation of processing the transfer instrument image to detect one or more dataset arrays identifying clusters of pixels is implemented with a clustering analysis; and
the system further comprises a neural network that performs the clustering analysis, and wherein the neural network comprises a neural network architecture selected from one of a convolutional neural network, a Hopefield network, a Boltzmann Machine, Sigmoid Belief Net, a Deep Belief Network, a Helmholtz Machine, a Kohonen Network, a Self-Organizing Map, or a Centroid Neural Network.

12. The system for implementing and augmenting a digital instrument of claim 10, wherein (i) the end user computing device displays a virtual guide, and (ii) the end user aligns the virtual guide with the transfer instrument by moving the image source device.

13. The system for implementing and augmenting a digital instrument of claim 9, wherein the electronic augmentation is rendered as partially opaque.

14. The system for implementing and augmenting a digital instrument of claim 9, wherein the electronic augmentation is rendered with a lower resolution than the source image data.

15. The system for implementing and augmenting a digital instrument of claim 9, wherein:
the end user computing device determines colorization of the source image data, and
the end user computing device determines electronic augmentation colorization to create a contrast between the electronic augmentation and the transfer instrument.

16. The system for implementing and augmenting a digital instrument of claim 9, wherein the electronic augmentation is selected by the end user and repositioned relative to the transfer instrument user.

17. The system for implementing and augmenting a digital instrument of claim 9, wherein:
the electronic augmentation comprises one or more text characters; and
the one or more text characters are edited by a user.

18. A method for implementing and augmenting a digital instrument comprising the steps of:

executing by a first processor of a first computing device, a role data check that defines marking data transmitted to an end user computing device;
generating by a second processor of a second computing device, an electronic augmentation using the marking data;
executing by the second processor, operations to generate a transfer instrument image using a camera comprising
communicating to an integrated display of the second computing device, user-readable instructions for a capturing an image of a transfer instrument with a camera in signal communication with the computing device,
activating the camera, wherein the camera receives an image through a camera lens and generates source image data that comprises a transfer instrument image;
performing a placement analysis to generate augmentation placement data, wherein the placement analysis generates augmentation placement data that corresponds to a location for the placement of an electronic augmentation on the transfer instrument image, wherein the placement analysis comprises the steps of
converting the source image data to black and white pixels with each pixel having a pixel coordinate position and a brightness value,
segmenting the source image data into one or more regions,
detecting boundary edges of the transfer instrument image by detecting changes in pixel brightness values above a brightness value threshold,
processing the transfer instrument image to detect one or more dataset arrays identifying clusters of pixels,
feeding the one or more dataset arrays to a cluster extraction analysis to identify a marking character or a marking feature within the transfer instrument image,
selecting an augmentation starting point that is a distance from the marking character or marking feature that permits placement of the electronic augmentation such that the augmentation pixel matrix does not overlap with the marking character or marking feature;
generating a modified transfer instrument image by displaying the transfer instrument image and the electronic augmentation, wherein the electronic augmentation is rendered as overlaid on the transfer instrument image according to the augmentation placement data;
receiving a confirmation input from the end user; and
generating, in response to the confirmation input, a digital instrument that comprises (i) a single combined image file that, when displays, renders the electronic augmentation placed on the transfer instrument; and (ii) marking data appended as metadata to the single combined image file.

19. The method for implementing and augmenting a digital instrument of claim 18, wherein the electronic augmentation comprises digital signature data; a product identification; and transfer instruction data.

* * * * *